(12) United States Patent
Kubota et al.

(10) Patent No.: US 11,361,226 B2
(45) Date of Patent: Jun. 14, 2022

(54) ANALYSIS APPARATUS, NON-TRANSITORY COMPUTER-READABLE STORAGE MEDIUM FOR STORING ANALYSIS PROGRAM, AND ANALYSIS METHOD

(71) Applicant: FUJITSU LIMITED, Kawasaki (JP)

(72) Inventors: Tomonori Kubota, Kawasaki (JP); Takanori Nakao, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 163 days.

(21) Appl. No.: 17/022,163

(22) Filed: Sep. 16, 2020

(65) Prior Publication Data

US 2021/0133584 A1    May 6, 2021

(30) Foreign Application Priority Data

Nov. 5, 2019    (JP) .............................. JP2019-200865

(51) Int. Cl.
*G06N 3/08*    (2006.01)
*G06K 9/62*    (2022.01)
(Continued)

(52) U.S. Cl.
CPC ........... *G06N 3/084* (2013.01); *G06K 9/6256* (2013.01); *G06K 9/6261* (2013.01);
(Continued)

(58) Field of Classification Search
CPC .. G06K 9/6256; G06K 9/6261; G06K 9/6262; G06K 9/6273; G06V 2201/08;
(Continued)

(56) References Cited

U.S. PATENT DOCUMENTS 10,984,757 B2 *   4/2021   Okamoto ................. G09G 5/37
2015/0243055 A1 *   8/2015   Nishiyama .............. G06T 19/20
382/131

FOREIGN PATENT DOCUMENTS

JP    2009-086926 A    4/2009
JP    2009-211490 A    9/2009
(Continued)

OTHER PUBLICATIONS

Ramprasaath R. Selvaraju et al., "Grad-CAM: Visual Explanations from Deep Networks via Gradient-based Localization", IEEE International Conference on Computer Vision(ICCV), pp. 618-626, IEEE Computer Society, 2017 (Total 9 pages).

*Primary Examiner* — Emily C Terrell
*Assistant Examiner* — Ahmed A Nasher
(74) *Attorney, Agent, or Firm* — Fujitsu Patent Center

(57) ABSTRACT

A method includes: generating a refine image from an incorrect image from which an incorrect label is inferred by a neural network; generating a third map by superimposing a first map and a second map, the first map indicating pixels to each of which a change is made in generating the refine image, of plural pixels in the incorrect image, the second map indicating a degree of attention for each local region in the refine image, each local region being a region that has drawn attention at the time of inference by the neural network, and the third map indicating a degree of importance for each pixel for inferring a correct label; and obtaining an added value for respective divided region in the third map by summing pixel values within the respective divided region, the respective divided region being a region divided according to a predetermined index.

9 Claims, 22 Drawing Sheets

(51) Int. Cl.
*G06T 5/50* (2006.01)
*G06T 3/40* (2006.01)

(52) U.S. Cl.
CPC .............. *G06T 3/4038* (2013.01); *G06T 5/50* (2013.01); *G06T 2207/20021* (2013.01); *G06T 2207/20212* (2013.01)

(58) Field of Classification Search
CPC .... G06V 10/267; G06V 10/462; G06V 10/82; G06N 3/0454; G06N 3/084; G06T 3/4038; G06T 5/50; G06T 2207/20021; G06T 2207/20212; G06T 2207/20081; G06T 2207/20084; G06T 2207/20164; G06T 7/11
See application file for complete search history.

(56) References Cited

FOREIGN PATENT DOCUMENTS

| | | | |
|---|---|---|---|
| JP | 2018-045350 | A | 3/2018 |
| JP | 2018-097807 | A | 6/2018 |
| JP | 2018097807 | A * | 6/2018 |

* cited by examiner

ANALYSIS APPARATUS, NON-TRANSITORY COMPUTER-READABLE STORAGE MEDIUM FOR STORING ANALYSIS PROGRAM, AND ANALYSIS METHOD

CROSS-REFERENCE TO RELATED APPLICATION

This application is based upon and claims the benefit of priority of the prior Japanese Patent Application No. 2019-200865, filed on Nov. 5, 2019, the entire contents of which are incorporated herein by reference.

FIELD

The embodiments discussed herein are related to an analysis apparatus, a non-transitory computer-readable storage medium for storing an analysis program, and an analysis method.

BACKGROUND

In recent years, analysis techniques have been proposed that analyze a cause of incorrect inference when an incorrect label is inferred in an image recognition process using a convolutional neural network (CNN). Such techniques include the activation maximization method. There are proposed the analysis techniques for analyzing an image section that draws attention at the time of inference in the image recognition process. Such techniques include a back propagation (BP) method and a guided back propagation (GBP) method.

The activation maximization method is a method of specifying, as an image section that causes incorrect inference, a changed portion when an input image is changed so that a correct label of inference has a maximum score. The BP method or the GBP method is a method of visualizing a feature portion that responds at the time of inference, by back propagating from an inferred label and tracing to an input image.

Examples of the related art include Japanese Laid-open Patent Publication Nos. 2018-097807 and 2018-045350.

Examples of the related art also include Ramprasaath R. Selvaraju, et al.: Grad-cam: Visual explanations from deep networks via gradient-based localization. The IEEE International Conference on Computer Vision (ICCV), pp. 618-626, 2017.

SUMMARY

According to an aspect of the embodiments, an analysis apparatus includes: a memory configured to store program instructions; and a processor coupled to the memory, the processor being configured to execute the program instructions stored in the memory, the program instructions including: executing an image generating processing configured to generate a refine image having a maximized correct label score of inference from an incorrect inference image from which an incorrect label is inferred by a neural network; executing a map generating processing configured to generate a third map by superimposing a first map and a second map, the first map indicating pixels to each of which a change is made in generating the refine image, of a plurality of pixels in the incorrect inference image, the second map indicating a degree of attention for each local region in the refine image, the each local region being a region that has drawn attention at the time of inference by the neural network, and the third map indicating a degree of importance for each of the pixels for inferring a correct label; and executing a specifying processing configured to obtain an added value for respective divided region in the third map by summing pixel values within the respective divided region, the respective divided region being a region divided according to a predetermined index, and specify, by using the added value, a first divided region from among divided regions, the first divided region being a divided region that includes pixels causing incorrect inference.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

Figure 1:
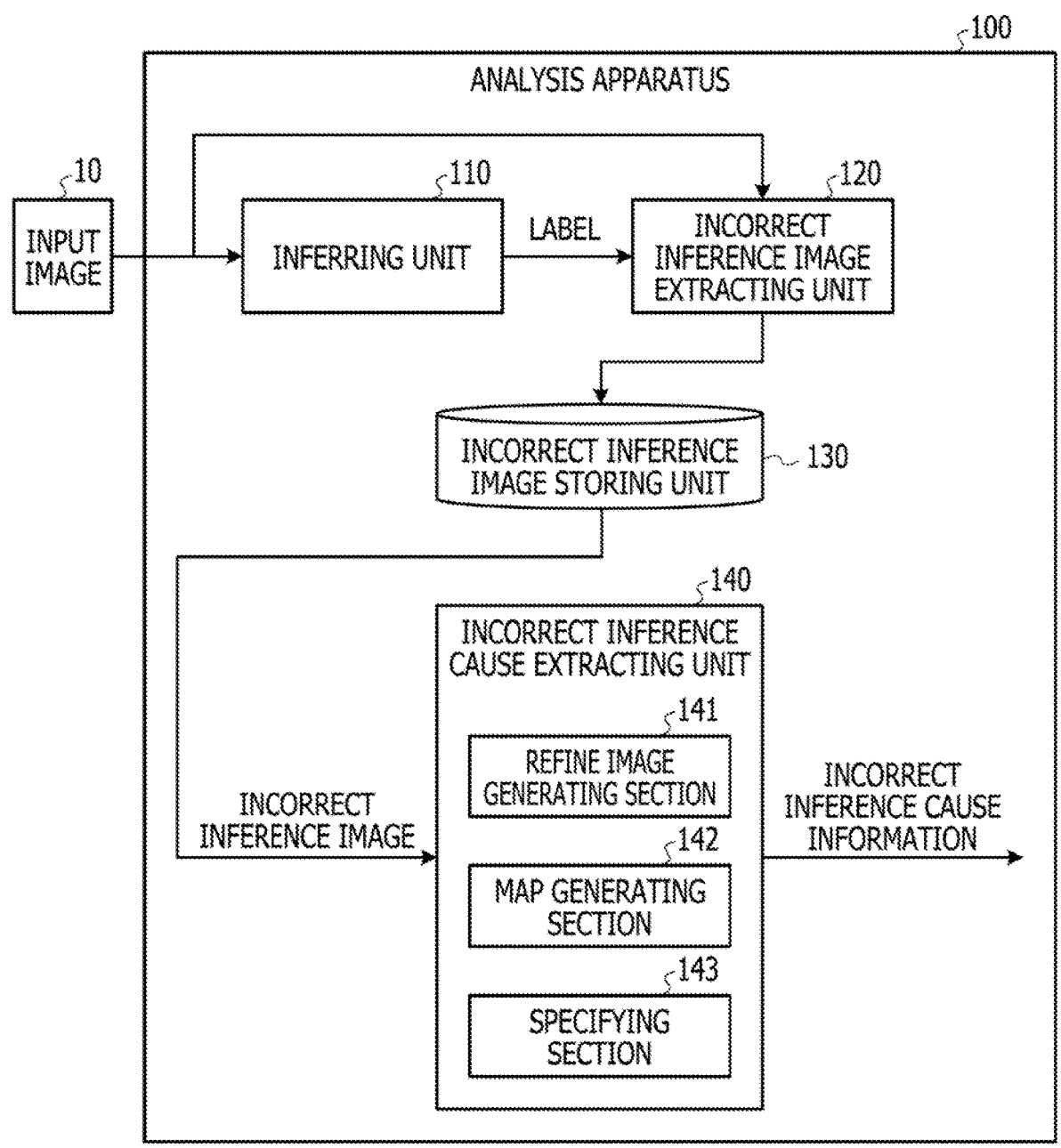
FIG. 1 is a diagram illustrating an example of a functional configuration of an analysis apparatus.

There is, however, a problem that the above-described analysis techniques may not specify an image section that causes incorrect inference with adequately high precision.

In an aspect, an objective of the present disclosure is to improve precision in specifying an image section that causes incorrect inference.

Hereinafter, embodiments are described with reference to the accompanying drawings. In the present specification and drawings, components having substantially same functional configurations are assigned with same reference numerals, and overlapping description is omitted.

First Embodiment

<Functional Configuration of Analysis Apparatus>

First, a functional configuration of an analysis apparatus according to a first embodiment is described. FIG. 1 illustrates an example of the functional configuration of the analysis apparatus. In an analysis apparatus 100, analysis programs are installed, and execution of the programs causes the analysis apparatus 100 to function as an inferring unit 110, an incorrect inference image extracting unit 120, and an incorrect inference cause extracting unit 140.

The inferring unit 110 performs an image recognition process using a pre-trained CNN. For example, upon input of an input image 10, the inferring unit 110 infers a label indicating a type of an object contained in the input image (a type of a vehicle in the present embodiment) and outputs the inferred label.

The incorrect inference image extracting unit 120 determines whether or not the label (correct label) indicating the type of the object contained in the input image 10 and the label inferred by the inferring unit 110 match. The incorrect inference image extracting unit 120 extracts the input image that is determined not to match (for which an incorrect label is inferred) as an "Incorrect inference image" and stores the image in an incorrect inference image storing unit 130.

The incorrect inference cause extracting unit 140 specifies an image section that causes incorrect inference in the incorrect inference image, and outputs incorrect inference cause information. For example, the incorrect inference cause extracting unit 140 includes a refine image generating section 141, a map generating section 142, and a specifying section 143.

The refine image generating section 141 is an example of an image generating section. The refine image generating section 141 reads the incorrect inference image stored in the incorrect inference image storing unit 130. The refine image generating section 141 generates a score-maximized refine image having a maximized correct label score of inference, from the read incorrect inference image.

The map generating section 142 uses the known analysis technique or the like for analyzing the cause of incorrect inference to generate a map indicating a degree of importance of each of the pixels for inferring a correct label.

The specifying section 143 segments the incorrect inference image into a plurality of regions, and replaces, with the generated score-maximized refine image, a region that is defined based on the generated map of the segmented plurality of regions. The specifying section 143 infers a label by inputting the incorrect inference image in which the region has been replaced with the score-maximized refine image, and determines the effect of the replacement from the score of the inferred label.

The specifying section 143 infers the label while updating the region, and specifies, region by region, the image section that causes incorrect inference from the score of the inferred label. The specifying section 143 outputs the specified image section that causes incorrect inference as the incorrect inference cause information.

As such, according to the incorrect inference cause extracting unit 140, it is possible to specify, with precision, an image section that causes incorrect inference by generating a map that indicates the degree of importance of each pixel for inferring a correct label with the known analysis technique, replacing a region defined based on the generated map with a score-maximized refine image, and specifying, region by region, the image section that causes incorrect inference while referring the effect of the replacement.

<Hardware Configuration of Analysis Apparatus>

Figure 2:
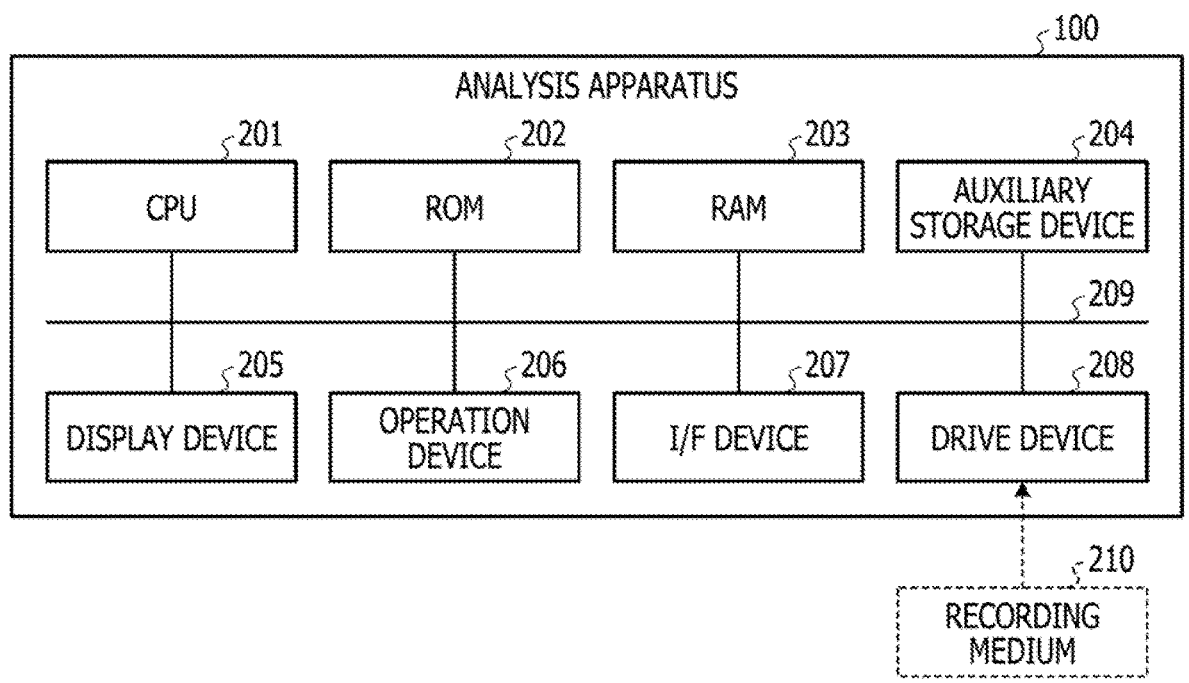
FIG. 2 is a diagram illustrating an example of a hardware configuration of the analysis apparatus.

Next, a hardware configuration of the analysis apparatus 100 is described. FIG. 2 illustrates an example of the hardware configuration of the analysis apparatus. As illustrated in FIG. 2, the analysis apparatus 100 includes a central processing unit (CPU) 201, a read-only memory (ROM) 202, and a random-access memory (RAM) 203. The CPU 201, the ROM 202, and the RAM 203 form a so-called computer.

The analysis apparatus 100 includes an auxiliary storage device 204, a display device 205, an operation device 206, an interface (I/F) device 207, and a drive device 208. Each of hardware components of the analysis apparatus 100 is coupled to each other via a bus 209.

The CPU 201 is a calculating device that runs various programs (for example, an analysis program and the like) installed in the auxiliary storage device 204. Although not illustrated in FIG. 2, an accelerator (for example, a graphics processing unit (GPU)) may be combined as a calculating device.

The ROM 202 is a non-volatile memory. The ROM 202 functions as a main storage device that stores various programs, data, and the like for the CPU 201 to execute the various programs installed in the auxiliary storage device 204. For example, the ROM 202 functions as a main storage device that stores a boot program such as a Basic Input/Output System (BIOS) and an Extensible Firmware Interface (EFI).

The RAM 203 is a volatile memory such as a dynamic random-access memory (DRAM) or a static random-access memory (SRAM). The RAM 203 functions as the main storage device that provides a work area where the various programs installed in the auxiliary storage device 204 are expanded for execution by the CPU 201.

The auxiliary storage device 204 is an auxiliary storage device that stores the various programs and information to be used for execution of the various programs. For example, the incorrect inference image storing unit 130 is implemented in the auxiliary storage device 204.

The display apparatus 205 is a display device that displays various display screens containing the incorrect inference cause information and the like. The operation device 206 is an input device for a user of the analysis apparatus 100 to input various instructions to the analysis apparatus 100.

The I/F device 207 is, for example, a communication device to couple to a network not illustrated.

The drive device 208 is a device in which a recording medium 210 is set. The recording media 210 discussed herein include media that record information optically, electrically, and magnetically like a CD-ROM, a flexible disk, a magneto-optical disk, and the like. The recording media 210 may also include a semiconductor memory and the like, such as the ROM, or a flash memory, which records information electrically.

The various programs to be installed in the auxiliary storage device 204 are installed, for example, as the distributed recording medium 210 is set in the drive device 208, and the various programs recorded in the recording medium 210 are read by the drive device 208. Alternatively, the various programs installed in the auxiliary storage device 204 may be installed by being downloaded from the network that is not illustrated.

<Functional Configuration of incorrect Inference Cause Extracting Unit>

Figure 3:
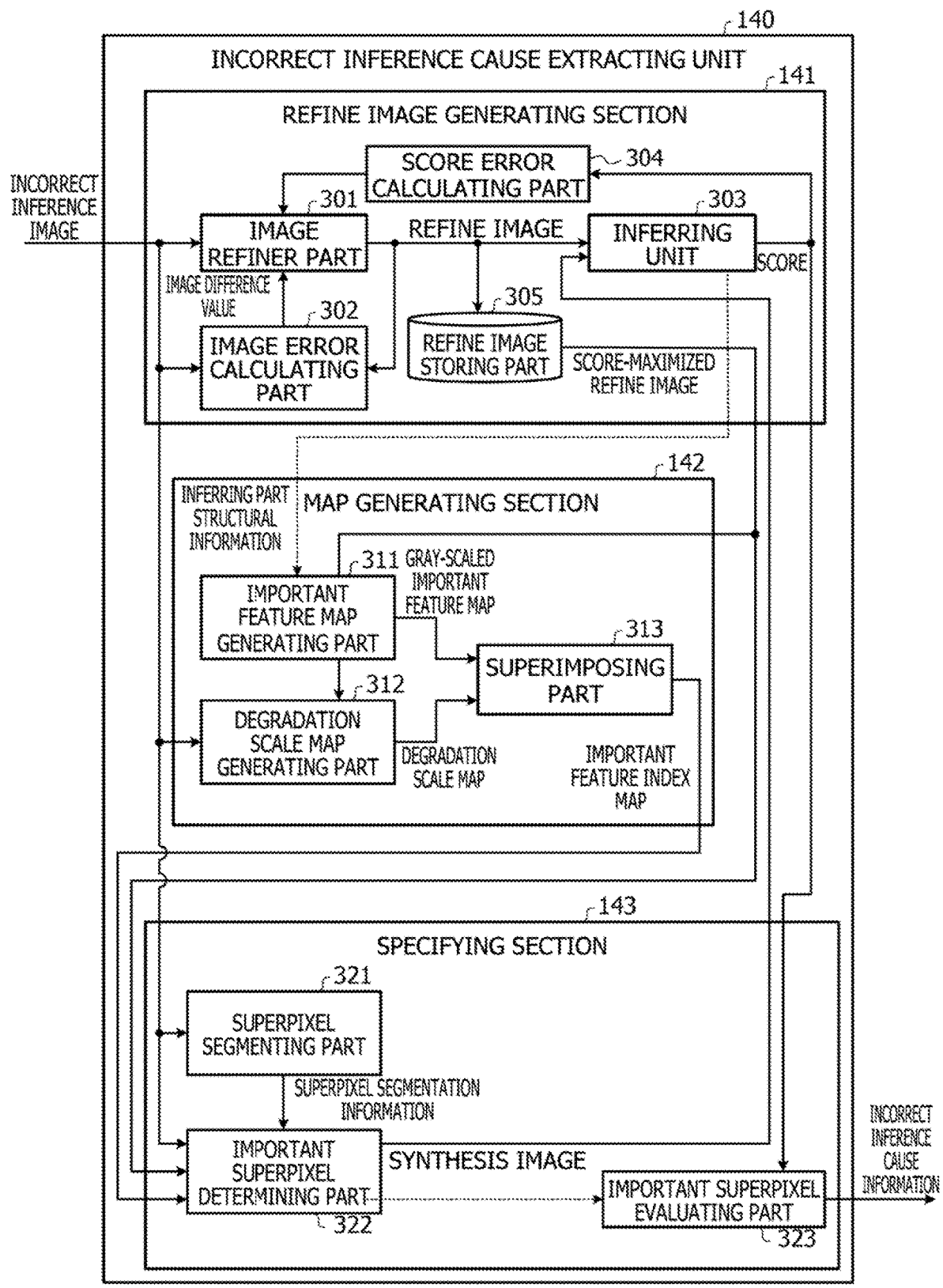
FIG. 3 is a first diagram illustrating an example of a functional configuration of an incorrect inference cause extracting unit.

Next, a functional configuration of the incorrect inference cause extracting unit 140 is described in detail among the functions implemented in the analysis apparatus 100 according to the first embodiment. FIG. 3 is a first diagram illustrating an example of the functional configuration of the incorrect inference cause extracting unit. Hereinafter, the components (the refine image generating section 141, the map generating section 142, and the specifying section 143) of the incorrect inference cause extracting unit 140 are described in detail.

(1) Details of Refine Image Generating Section

First, the refine image generating section 141 is described in detail. As illustrated in FIG. 3, the refine image generating section 141 includes an image refiner part 301, an image error calculating part 302, an inferring part 303, and a score error calculating part 304.

The image refiner part 301 generates a refine image from the incorrect inference image using the CNN as an image generation model, for example.

When making inference using the generated refine image, the image refiner part 301 changes the incorrect inference image such that the correct label score is maximized. The image refiner part 301 generates the refine image such that the amount of change from the incorrect inference image (the difference between the refine image and the incorrect inference image) is reduced.

For example, the image refiner part 301 performs CNN training so as to minimize a score error which is a difference between a score when making inference using the generated refine image and the score maximized from the correct label score, and to minimize an image difference value that is a difference between the generated refine image and the incorrect inference image (for example, an image difference (L1 difference), structural similarity (SSIM), or a combination thereof).

The image error calculating part 302 calculates the difference between the incorrect inference image and the refined image output from the image refiner unit 301 during learning, and inputs the image difference value to the image refiner part 301. The image error calculating part 302 calculates the image difference value by performing difference (L1 difference) calculation for each pixel or structural similarity (SSIM) calculation, for example, and inputs the image difference value to the image refiner part 301.

The inferring part 303 performs an image recognition process using a pre-trained CNN. The inferring part 303 includes the trained CNN that infers a label by inputting the refine image (or score-maximized refine image) generated by the image refiner part 301 or a synthesis image generated by an important superpixel determining part 322, and calculates a score. The synthesis image mentioned herein shall refer to the incorrect inference image, a region of which is replaced with the score-maximized refine image, the region being extracted based on a map (important feature index map) generated by the map generating section 142.

The score outputted by the inferring part 303 is notified to the score error calculating part 304 or an important superpixel evaluating part 323.

The score error calculating part 304 calculates an error between the score notified by the inferring part 303 and the score maximized from the correct label score and notifies the score error to the image refiner part 301. The score error notified by the score error calculating part 304 is used in the image refiner part 301 for training the CNN.

The refine image outputted from the image refiner part 301 during the training of the CNN included in the image refiner part 301 is stored in a refine image storing part 305. The training of the CNN included in the image refiner part 301 is performed for a predetermined number of training iterations (for example, the maximum number of training iterations=N times), or until the correct label score exceeds a predetermined threshold, or until the correct label score exceeds the predetermined threshold and the image difference value falls below the predetermined threshold. Accordingly, the score-maximized refine image, which is the refined image when the correct label score outputted from the inferring part 303 is maximized, is stored in the refine image storing part 305.

(2) Details of Map Generating Section

Next, the map generating section 142 is described in detail. As illustrated in FIG. 3, the map generating section 142 includes an important feature map generating part 311, a degradation scale map generating part 312, and a superimposing part 313.

The important feature map generating part 311 acquires, from the inferring part 303, inferring part structural information at the time of inferring a label with the score-maximized refine image as an input. The important feature map generating part 311 generates a "gray-scaled important feature map" based on the inferring part structural information using known algorithms. The examples of the known algorithms include, but are not limited to, the back propagation (BP) method, the guided back propagation (GBP) method, or a selective BP method. The gray-scaled important feature map is an example of a second map, and is a map gray-scaled to indicate a degree of attention of each of pixels that has drawn attention at the time of inference, of a plurality of the pixels in the score-maximized refine image. It is noted that the size of the second map may be different from the size of the score-maximized refine image.

The BP method is a method of visualizing a feature portion, by calculating an error of each label from each score that is obtained by making inference of input image whose inferred label is correct (here, the score-maximized refine image) and imaging the magnitude of gradient information that is obtained by back-propagating to an input layer. The GBP method is a method of visualizing a feature portion by imaging only a positive value of the magnitude of the gradient information.

The selective BP method is a method of maximizing only an error of a correct label and then performing processing using the BP method or the GBP method. In the case of the selective BP method, a feature portion to be visualized is a feature portion that affects only the correct label score.

The degradation scale map generating part 312 generates a "degradation scale map", which is an example of a first map, based on an incorrect inference image and a score-maximized refine image. The degradation scale map indicates a degree of change of each pixel that is changed when the score-maximized refine image is generated.

The superimposing part 313 generates an "important feature index map", which is an example of a third map, by superimposing the gray-scaled important feature map generated by the important feature map generating part 311 and the degradation scale map generated by the degradation scale map generating part 312. The important feature index map indicates a degree of importance of each pixel for inferring a correct label. It is noted that the size of the second map may be different from the size of the first map (e.g., the degradation scale map).

(3) Details of Specifying Section

Next, the specifying section 143 is described in detail. As illustrated in FIG. 3, the specifying section 143 includes a superpixel segmenting part 321, an important superpixel determining part 322, and an important superpixel evaluating part 323.

The superpixel segmenting part 321 segments the incorrect inference image into "superpixes" which are regions of each element object (each component of a vehicle in this embodiment) of an object (the vehicle in this embodiment) contained in the incorrect inference image, and outputs superpixel segmentation information. In segmenting the incorrect inference image into the superpixels, an existing segmentation function is utilized, or CNN and the like trained to segment for each component of the vehicle is utilized.

The important superpixel determining part 322 adds up a pixel value of each pixel of the important feature index map generated by the superimposing part 313 for each superpixel, based on the superpixel segmentation information outputted by the superpixel segmenting part 321.

The important superpixel determining part 322 extracts a superpixel having an added value that satisfies a predetermined condition (being larger than or equal to an important feature index threshold) among the superpixels. The important superpixel determining part 322 defines, as a changeable region (a first region to be replaced by the score-maximized refine image), a superpixel group that is a combination of superpixels selected from the extracted superpixels. The important superpixel determining part 322 defines, as an unchangeable region (a second region not to be replaced by the score-maximized refine image), a superpixel group other than the combined superpixel group.

The important superpixel determining part 322 not only extracts an image section corresponding to the unchangeable region from the incorrect inference image, but also extracts an image section corresponding to the changeable region from the score-maximized refine image, and generates a synthesis image by synthesizing these image sections.

The important superpixel determining part 322 increases the number of superpixels to be extracted (widens the changeable region and narrows the unchangeable region) by gradually lowering the important feature index threshold used in defining the changeable region and the unchangeable region. The important superpixel determining part 322 updates the changeable region and the unchangeable region which are to be defined, while changing the combination of the superpixels to be selected from the extracted superpixels.

The important superpixel evaluating part 323 acquires a correct label score to be inferred every time the synthesis image generated by the important superpixel determining part 322 is inputted to the inferring part 303.

As described above, the important superpixel determining part 322 generates synthesis images, the number of which corresponds to the number of times of lowering the important feature index threshold and the number of combinations of superpixels. Consequently, the important superpixel evaluating part 323 acquires the correct label scores, the number of which corresponds to the above number.

The important superpixel evaluating part 323 specifies a combination of superpixels (changeable region) that causes incorrect inference based on the acquired scores, and outputs the specified combination as the incorrect inference cause information.

At this time, the important superpixel evaluating part 323 specifies the changeable region so that an area is as small as possible. For example, when evaluating the scores acquired from the inferring part 303, the important superpixel evaluating part 323 preferentially evaluates a superpixel having a small area in ascending order, of superpixels before the important feature index threshold is lowered or combinations of superpixels. The important superpixel evaluating part 323 specifies a changeable region (a changeable region that is extracted with the important feature index threshold at a limit capable of inferring a correct label and has the smallest area) at which time the correct label is inferred as the important feature index threshold is lowered.

<Specific Example of Processing of Components of incorrect Inference Cause Extracting Unit>

Next, specific examples of processing of the components (the refine image generating section 141, the map generating section 142, and the specifying section 143) of the incorrect inference cause extracting unit 140 are described.

(1) Specific Example of Processing of Refine Image Generating Section

Figure 4:
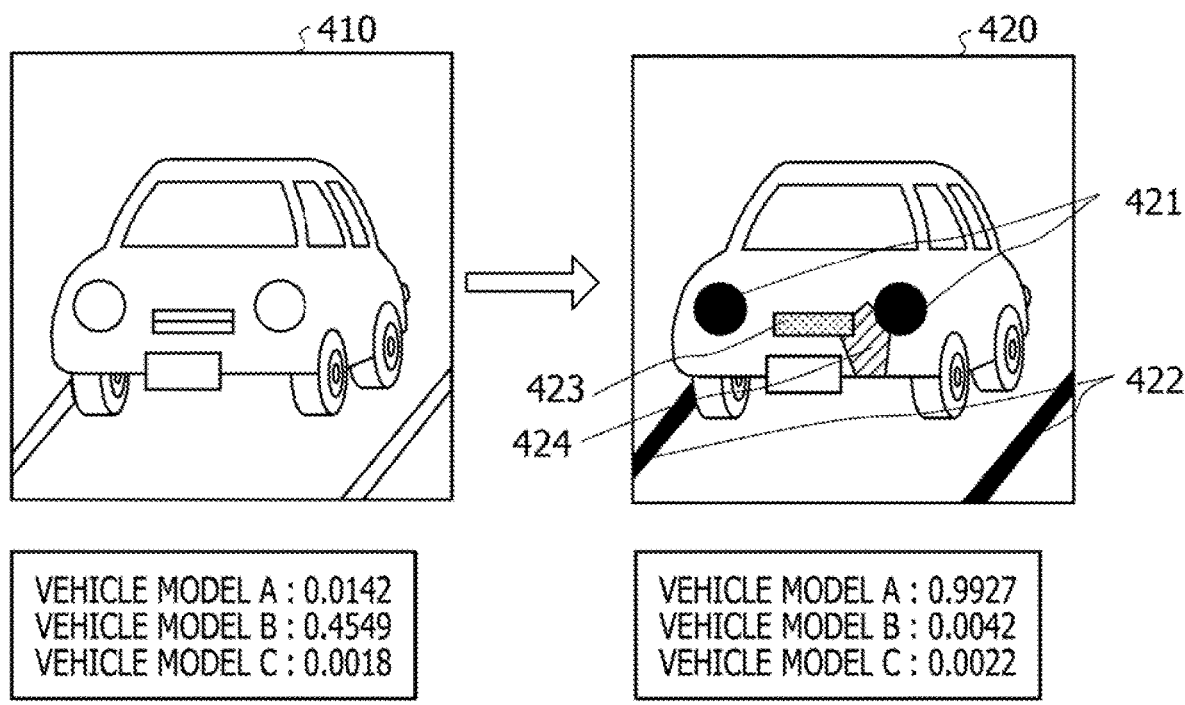
FIG. 4 is a diagram illustrating a specific example of processing of a refine image generating section.

First, a specific example of processing of the refine image generating section 141 is described. FIG. 4 illustrates a specific example of the processing of the refine image generating section. The example on the left side of FIG. 4 illustrates a case where as a result of inferring a label with an incorrect inference image 410 containing a vehicle having a correct label="vehicle model A" as an input, the label was incorrectly inferred as "vehicle model B".

The example on the left side of FIG. 4 illustrates that the scores in the case of inferring the label with the incorrect inference image 410 as the input were the score of the vehicle model A=0.0142, the score of the vehicle model B=0.4549, and the score of a vehicle model C=0.0018.

On the other hand, the example on the right side of FIG. 4 illustrates a case where the refine image generating section 141 has performed a process of generating a refine image from the incorrect inference image 410 to generate a score-maximized refine image 420. The example on the right side of FIG. 4 illustrates that the score-maximized refine image 420 is generated by changing the color of the headlights 421, the color of the road signs 422, the color of the front grille 423, and the color of the vehicle body 424 between the front grille 423 and the left headlight 421.

The example on the right side of FIG. 4 illustrates that inferring a label with the score-maximized refine image 420 as the input has made it possible to infer a label that matches the correct label="vehicle model A". The example on the right side of FIG. 4 illustrates that the scores when inferring the label with the score-maximized refine image 420 as the input were the score of the vehicle model A=0.9927, the score of the vehicle model B=0.0042, and the score of the vehicle model C=0.0022.

In this manner, by changing the incorrect inference image 410, the refine image generating section 141 makes it possible to generate the score-maximized refine image 420 that allows for inference of a label matching the correct label and that has the maximized correct label score.

As illustrated in the example on the right side of FIG. 4, in the case of the score-maximized refine image 420 generated by the refine image generating section 141, even the road sign irrelevant to the vehicle is changed, with respect to the incorrect inference image 410. This is because although error back propagation in the training to maximize the correct label score affects a route (unit) for the CNN which affects the correct label score, the affected route (unit) is not exactly related to a cause of the incorrect inference.

For example, when an attempt is made to specify an image section that causes incorrect inference based on a changed portion as with the existing activation maximization method, there is a problem that it is difficult to specify the image section with adequate precision (further narrowing is desired for the changed portion). In the incorrect inference cause extracting unit 140 according to this embodiment, the map generating section 142 and the specifying section 143 function to perform the further narrowing.

(2) Specific Example of Processing of Map Generating Section

Figure 5:
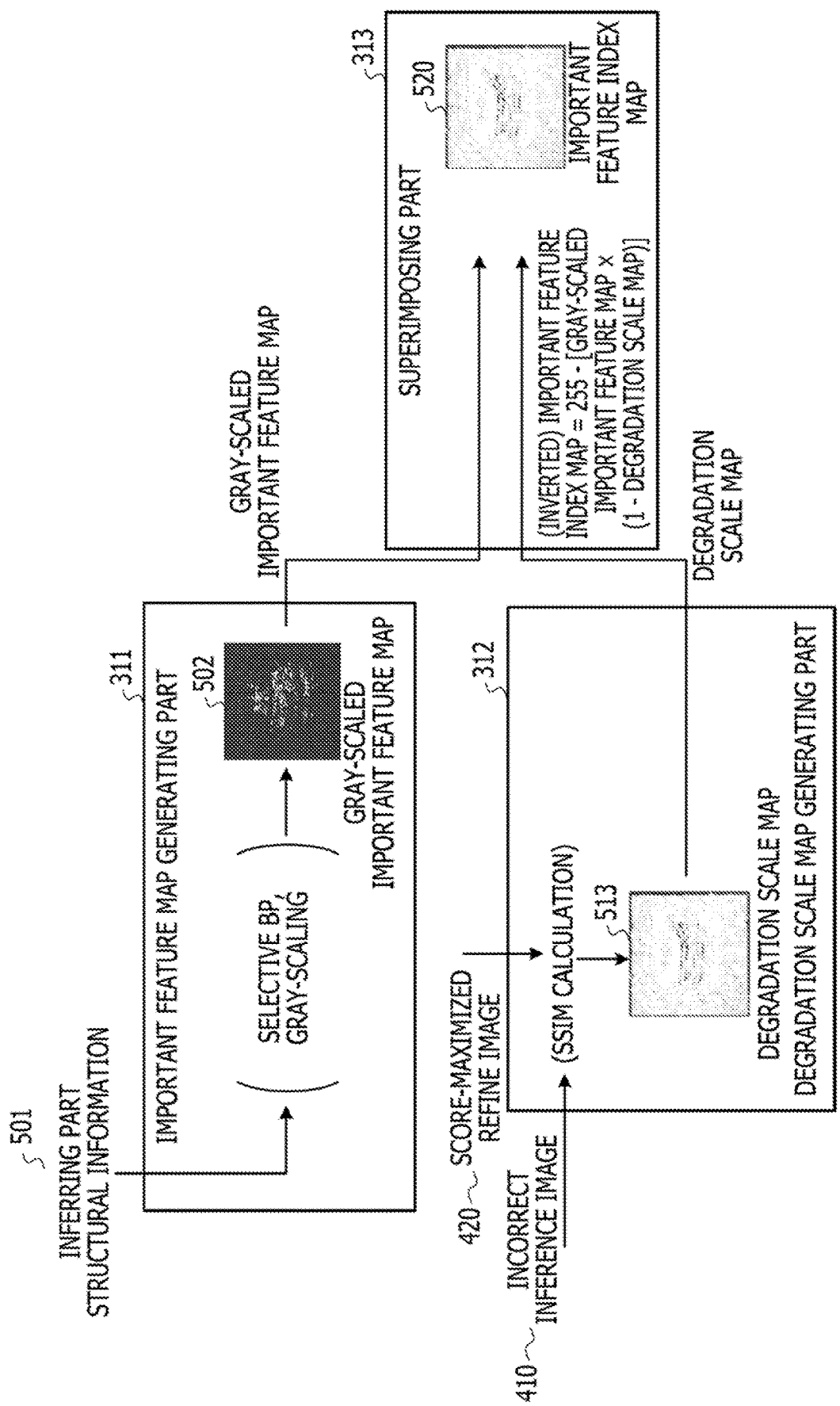
FIG. 5 is a diagram illustrating a specific example of processing of a map generating section.

Next, a specific example of processing of the map generating section 142 is described. FIG. 5 illustrates a specific example of the processing of the map generating section.

As illustrated in FIG. 5, in the map generating section 142, the important feature map generating part 311 acquires, from the inferring part 303, inferring part structural information 501 at the time when the inferring part 303 inputs the score-maximized refine image 420 to infer the label. The important feature map generating part 311 generates an important feature map based on the acquired inferring part structural information 501, by using the selective BP method, for example.

The important feature map generating part 311 gray-scales the generated important feature map to generate a gray-scaled important feature map 502.

The gray-scaled important feature map 502 illustrated in FIG. 5 is gray-scaled with pixel values of 0 to 255. In the gray-scaled important feature map 502, pixels having pixel values close to 255 are pixels with a high degree of attention (attention-drawing pixels) at the time of inference, and pixels having pixel values close to 0 are pixels with a low degree of attention (non-attention drawing pixels) at the time of the inference.

On the other hand, the degradation scale map generating part 312 reads the score-maximized refine image 420 from the refine image storing part 305 and performs structural similarity (SSIM) calculation between the score-maximized refine image 420 and the incorrect inference image 410. As such, the degradation scale map generating part 312 generates a degradation scale map 513. The degradation scale map 513 take values from 0 to 1, and indicates that the closer to 1 the pixel value is, the smaller the degree of change is, while the closer to 0 the pixel value is, the larger the degree of change is.

The superimposing part 313 uses the gray-scaled important feature map 502 generated by the important feature map generating part 311 and the degradation scale map 513 generated by the degradation scale map generating part 312, and generates an important feature index map 520.

For example, the superimposing part 313 generates the important feature index map 520 based on the following equation:

$$\text{Important feature index map} = \text{gray-scaled important feature map} \times (1-\text{degradation scale map}) \quad \text{(Equation 1)}$$

In the above equation 1, the term (1−degradation scale map) takes a value from 0 to 1; the degree of change is larger as the value is closer to 1, and is smaller as the value is closer to 0. For example, the important feature index map 520 is generated by adding intensity of the degree of change to the gray-scaled important feature map that indicates the degree of attention of each pixel that draws attention at the time of inference, and indicates the degree of importance of each pixel for inferring a correct label.

For example, the important feature index map 520 is generated by reducing the pixel values of the gray-scaled important feature map in a portion where the degree of change is small in the degradation scale map 513 and by increasing the pixel values of the gray-scaled important feature map in a portion where the degree of change is large in the degradation scale map 513.

To facilitate visualization, the important feature index map may be inverted. The important feature index map illustrated in FIG. 5 is an important feature index map that is inverted based on the following equation:

$$\text{(Inverted) important feature index map} = 255 - [\text{gray-scaled important feature map} \times (1-\text{degradation scale map})] \quad \text{(Equation 2)}$$

The advantages of the superimposing part 313 superimposing the gray-scaled important feature map 502 and the degradation scale map 513 based on the above equation are described.

As described above, the gray-scaled important feature map 502 generated by the important feature map generating part 311 is nothing less than attention portions that draw attention of the inferring part 303 when the correct label score is maximized.

On the other hand, the degradation scale map 513 generated by the degradation scale map generating part 312 represents a changed portion when an incorrect inference image is changed such that the correct label score is maximized, and represents a region that causes incorrect inference. Nevertheless, the degradation scale map 513 generated by the degradation scale map generating part 312 is not a minimum portion for inferring the correct label.

The superimposing part 313 visualizes the minimum portion for inferring the correct label as an important portion for inferring a correct label, by superimposing the changed portion when the incorrect inference image is changed such that the correct label score is maximized and the attention portion that draw attention of the inferring part 303.

(3) Specific Example of Processing of Specifying Section

Next, specific examples of processing of the components of the specifying section 143 (the superpixel segmenting part 321 and the important superpixel determining part 322) are described.

(3-1) Specific Example of Processing of Superpixel Segmenting Part

Figure 6:
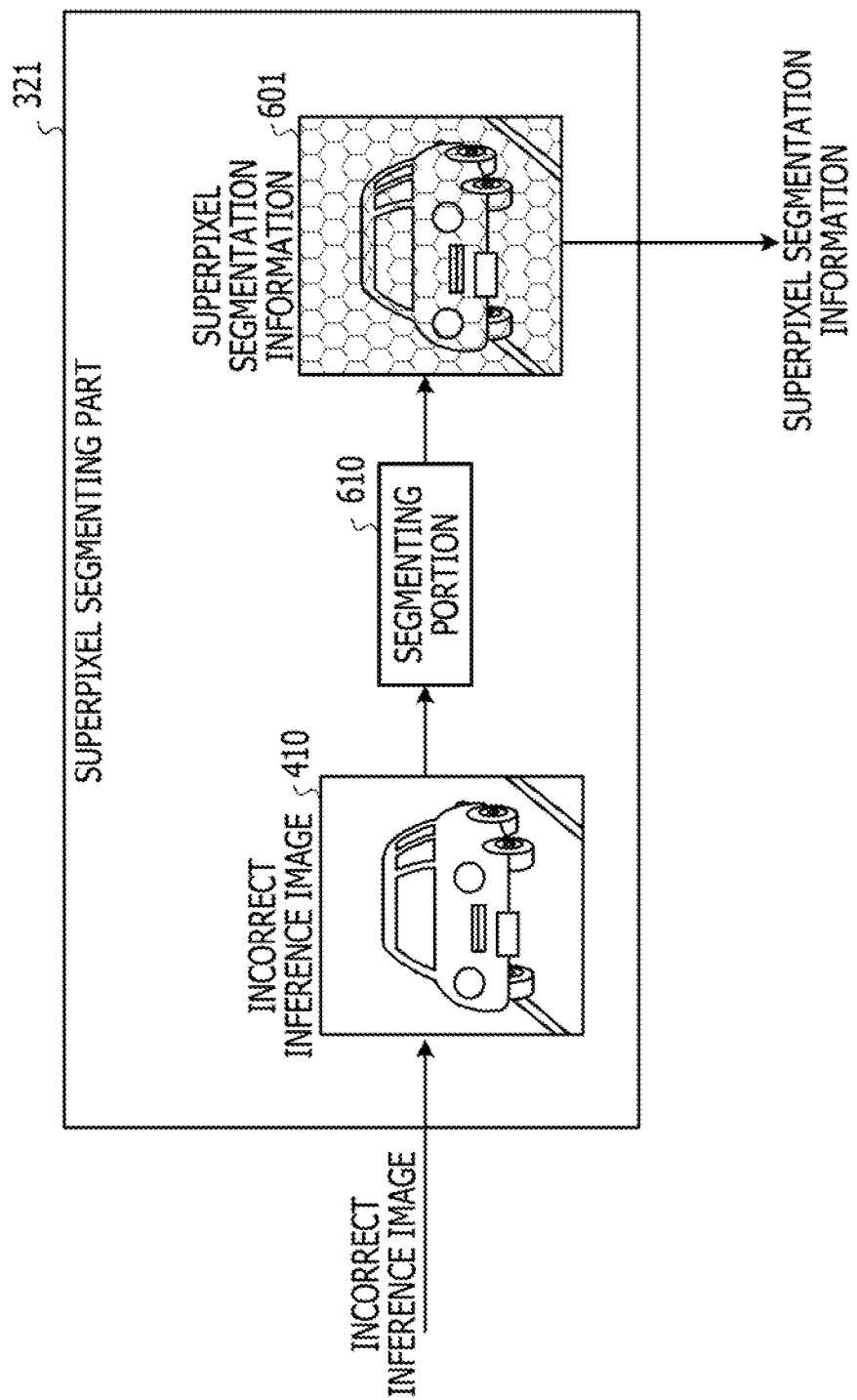
FIG. 6 is a first diagram illustrating a specific example of processing of a superpixel segmenting part.

First, a specific example of the processing of the superpixel segmenting part 321 included in the specifying section 143 is described. FIG. 6 illustrates the specific example of the processing of the superpixel segmenting part. As illustrated in FIG. 6, the superpixel segmenting part 321 includes a segmenting portion 610 that performs a simple linear iterative clustering (SUC) process, for example. The segmenting portion 610 segments the incorrect inference image 410 into superpixels which are partial images of each component of the vehicle contained in the incorrect inference image 410. The superpixel segmenting part 321 outputs superpixel segmentation information 601 generated by the segmentation into the superpixels by the segmenting portion 610.

(3-2) Specific Example of Processing of important Superpixel Determining Part

Figure 7:
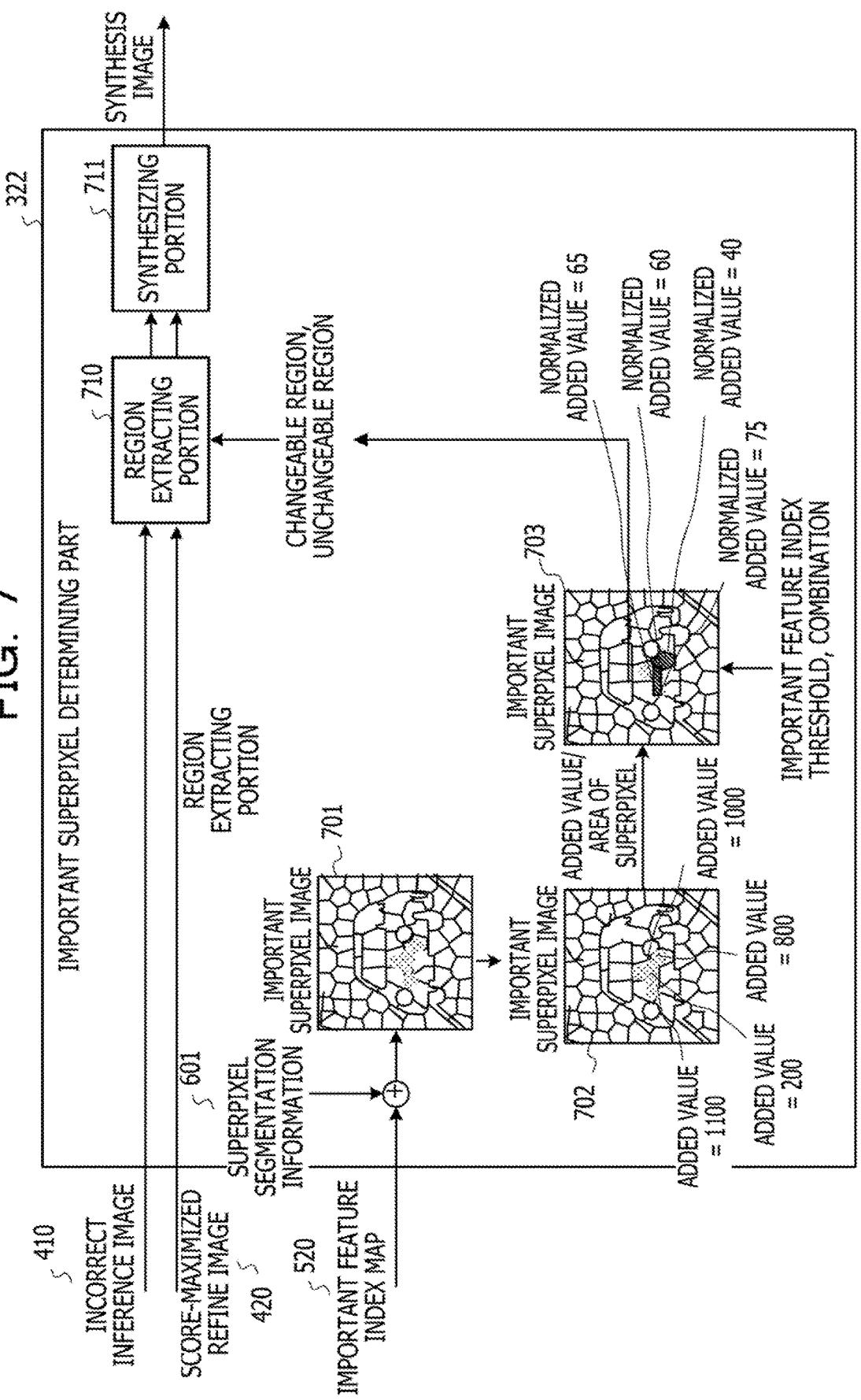
FIG. 7 is a first diagram illustrating a specific example of processing of an important superpixel determining part.

Next, a specific example of the processing of the important superpixel determining part 322 included in the specifying section 143 is described. FIG. 7 is a first diagram illustrating the specific example of the processing of the important superpixel determining part.

As illustrated in FIG. 7, the important superpixel determining part 322 includes a region extracting portion 710 and a synthesizing portion 711.

The important superpixel determining part 322 superimposes the important feature index map 520 outputted from the superimposing part 313 and the superpixel segmentation information 601 outputted from the superpixel segmenting part 321. As such, the important superpixel determining part 322 generates an important superpixel image 701. FIG. 7 illustrates a case where an (inverted) important feature index map is used as the important feature index maps 520.

The important superpixel determining part 322 adds up a pixel value of each pixel of the important feature index map 520 for each superpixel in the generated important superpixel image 701. In FIG. 7, an important superpixel image 702 dearly illustrates an example of the added value for each superpixel.

The important superpixel determining part 322 divides the added value for each superpixel by the area of each superpixel. Thus, the important superpixel determining part 322 calculates the added value per unit area (normalized added value) for each superpixel. For example, the important superpixel determining part 322 calculates the normalized added value for each superpixel as the added value of the pixel value for each region according to a predetermined index, based on the pixel value of each pixel in the important feature index map 520.

By calculating the normalized added value as described above, it is possible to reduce variations in the added value due to differences in area between the superpixels. In FIG. 7, an important superpixel image 703 dearly illustrates an example of the normalized added value for each superpixel.

The important superpixel determining part 322 determines whether the normalized added value for each superpixel is larger than or equal to the Important feature index threshold, and extracts superpixels for which the normalized added value is determined to be larger than or equal to the important feature index threshold.

The important superpixel determining part 322 combines the superpixes selected from the extracted superpixels, and defines the combined superpixels as the changeable region. The shaded area included in the important superpixel image 703 in FIG. 7 is an example of the changeable region. The important superpixel determining part 322 defines the superpixels other than the combined superpixels as an unchangeable region. The important superpixel determining part 322 notifies the region extracting portion 710 of the defined changeable region and unchangeable region.

The region extracting portion 710 extracts an image section corresponding to the unchangeable region from the incorrect inference image 410 and extracts an image section corresponding to the changeable region from the score-maximized refine image 420.

The synthesizing portion 711 synthesizes the image section corresponding to the changeable region extracted from the score-maximized refine image 420, and the image section corresponding to the unchangeable region extracted from the incorrect inference image 410 and generates a synthesis image.

Figure 8:
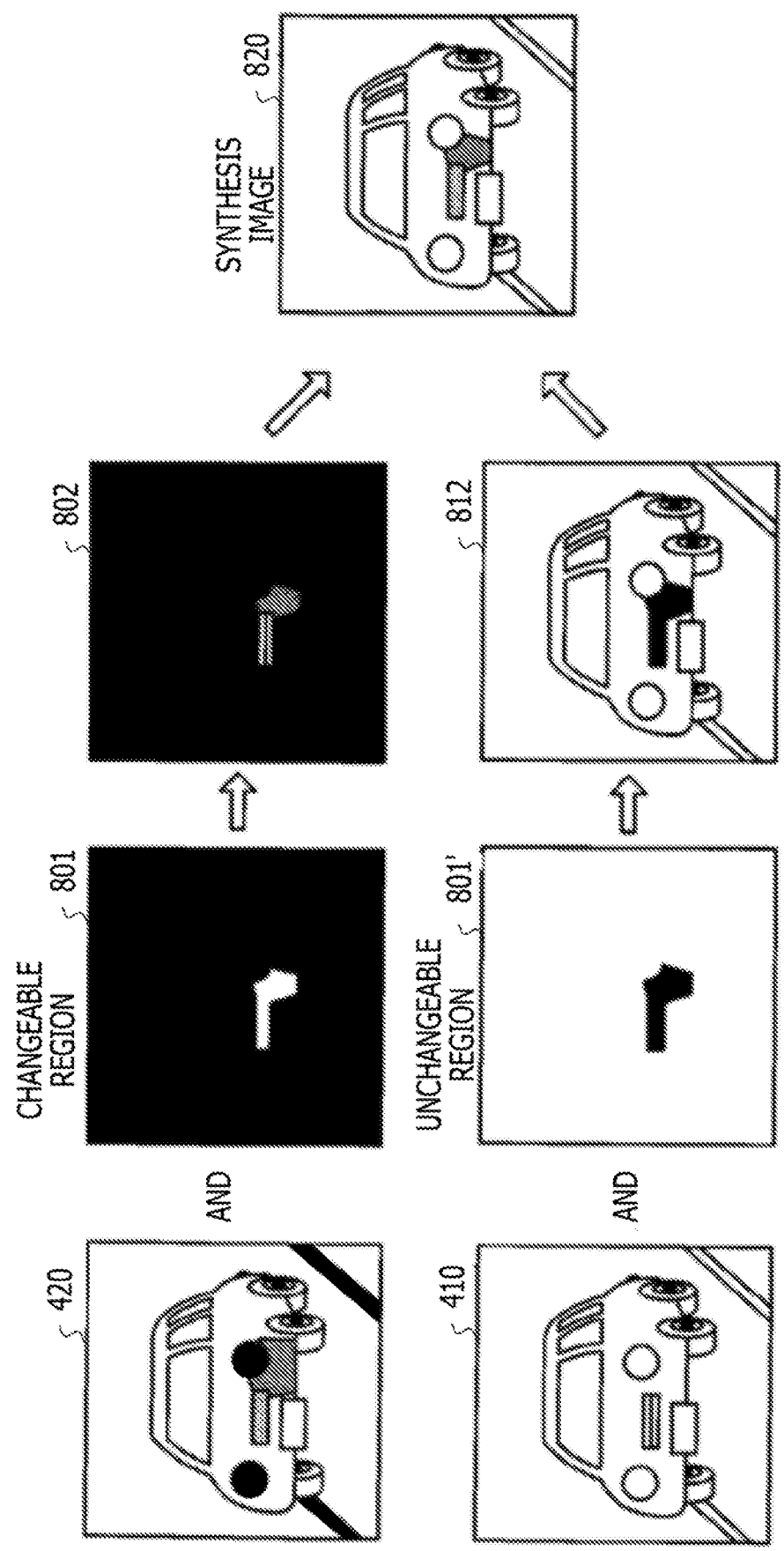
FIG. 8 is a first diagram illustrating a specific example of processes of a region extracting portion and a synthesizing portion.

FIG. 8 is a first diagram illustrating a specific example of processes of the region extracting portion and the synthesizing portion. In FIG. 8, the upper column illustrates a case where the region extracting portion 710 extracts an image section corresponding to the changeable region 801 (white portion) from the score-maximized refine image 420.

On the other hand, in FIG. 8, the lower column illustrates a case where the region extracting portion 710 extracts an image section corresponding to the unchangeable region 801' (white portion) from the incorrect inference image 410. In FIG. 8, the unchangeable region 801' is obtained by inverting the white portion and the black portion of the changeable region 801 (for the sake of explanation, in the lower column of FIG. 8, the white portion represents the unchangeable region).

As illustrated in FIG. 8, the synthesizing portion 711 synthesizes the image section corresponding to the changeable region 801 in the score-maximized refine image 420 and the image section corresponding to the unchangeable region 801' in the incorrect inference image 410, which are outputted from the region extracting portion 710, and generates a synthesis image 820.

Thus, the specifying section 143 normalizes the pixel values of the important feature index map 520 when adding the pixel values for each superpixel. As a result, the specifying section 143 may extract the superpixels that serve as the changeable region without depending on the size of the superpixels.

<Flow of incorrect Inference Cause Extracting Process>

Figure 9:
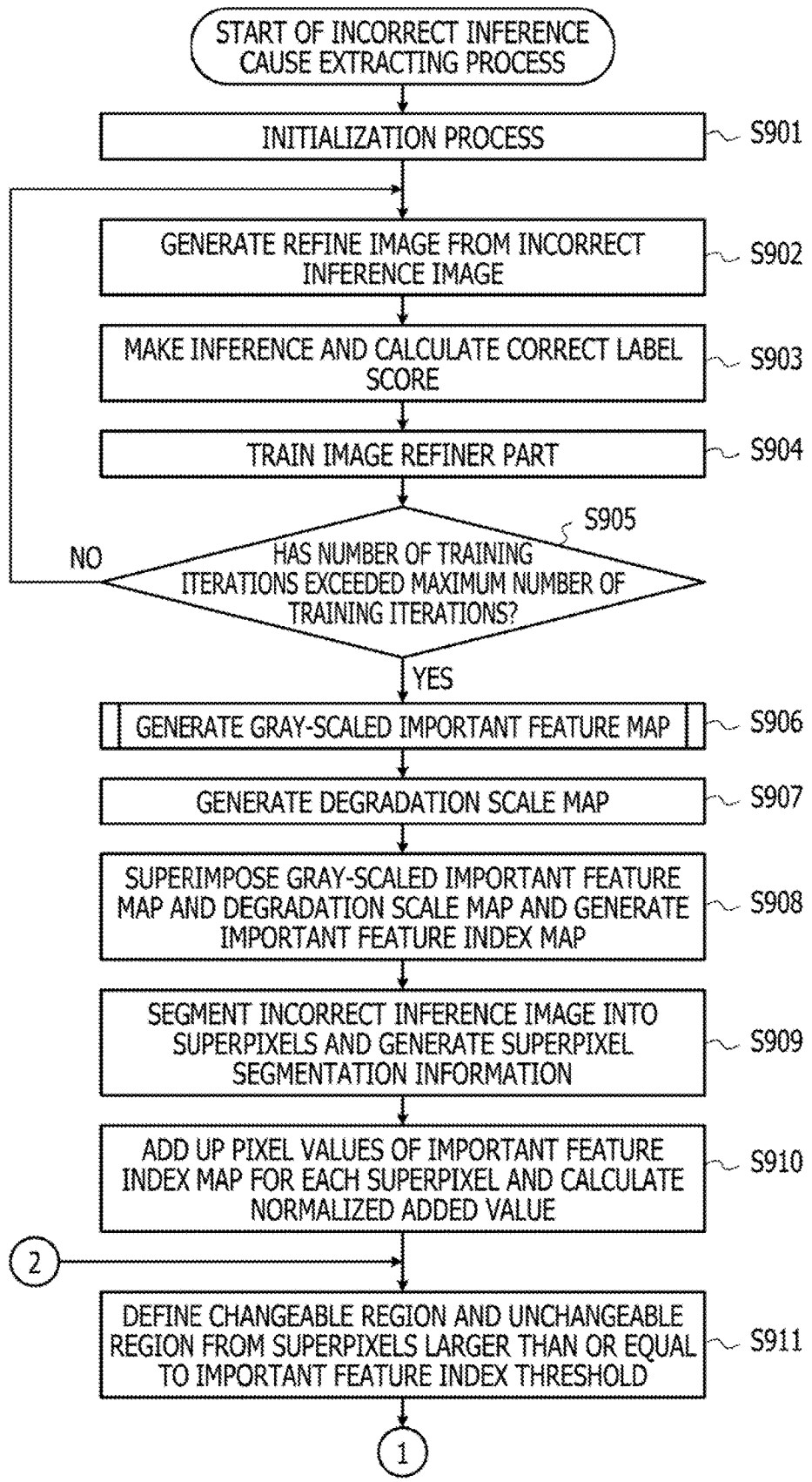
FIG. 9 is a first flowchart illustrating a flow of an incorrect inference cause extracting process.
Figure 10:
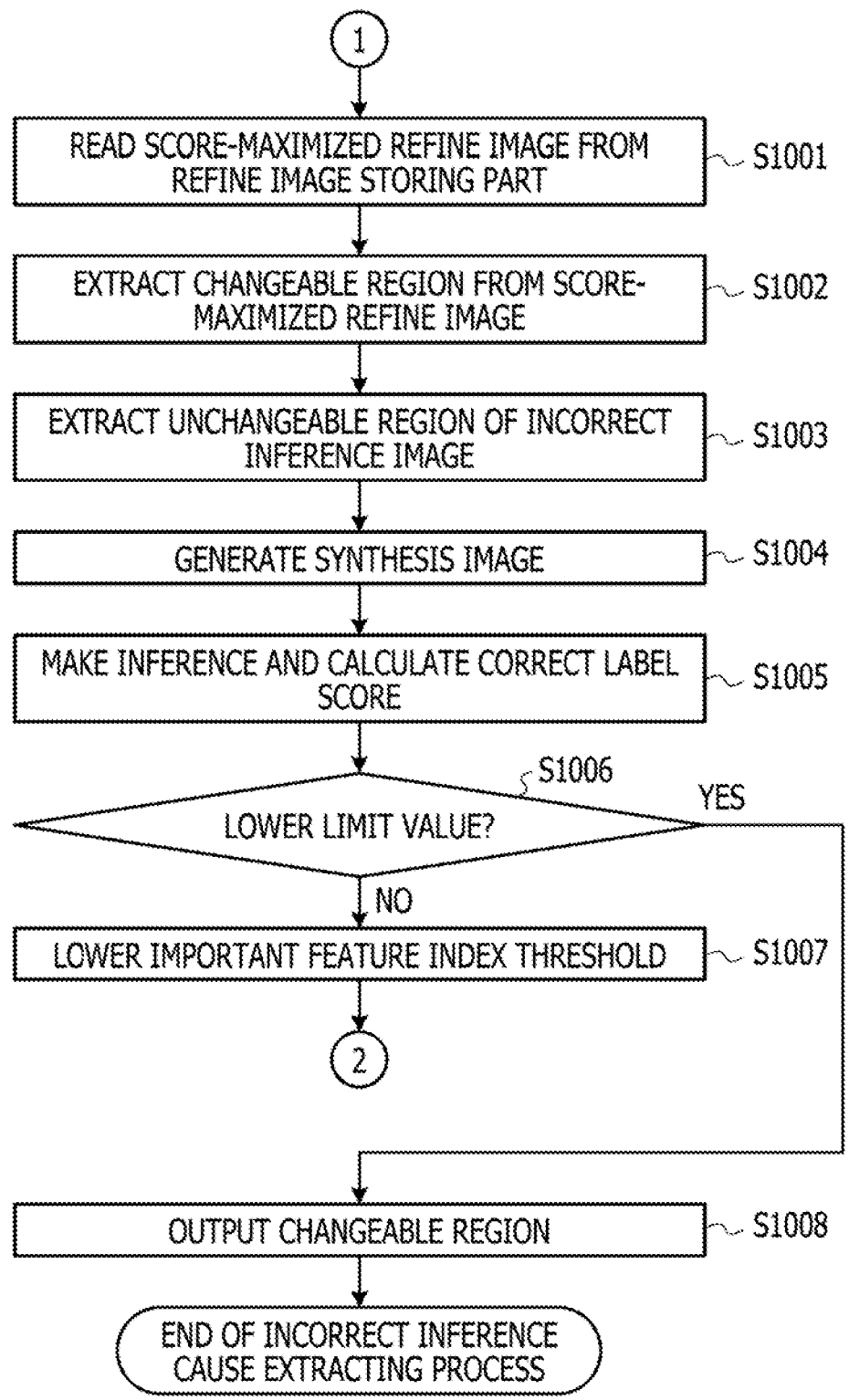
FIG. 10 is a second flowchart illustrating the flow of the incorrect inference cause extracting process.

Next, flow of an incorrect inference cause extracting process performed by the incorrect inference cause extracting unit 140 is described. FIGS. 9 and 10 are first and second flowcharts illustrating the flow of the incorrect inference cause extracting process.

In step S901, each component of the incorrect inference cause extracting unit 140 performs an initialization process. For example, the image refiner part 301 sets the number of training iterations for the CNN to zero and sets the maximum number of training iterations to a value instructed by the user. The important superpixel determining part 322 sets the important feature index threshold and a lower limit value thereof to values instructed by the user.

In step S902, the image refiner part 301 changes the incorrect inference image to generate a refine image.

In step S903, the inferring part 303 infers a label with the refine image as an input and calculates the correct label score.

In step S904, the image refiner part 301 conducts the CNN training using an image difference value and a score error.

In step S905, the image refiner part 301 determines whether or not the number of training iterations exceeds the maximum number of training iterations. In step S905, when the image refiner part 301 determines that the number of training iterations does not exceed the maximum number of training iterations (No in step S905), the process returns to step S902 and the generation of the refine image continues.

On the other hand, in step S905, when the image refiner part 301 determines that the number of training iterations exceeds the maximum number of training iterations (Yes in step S905), the process proceeds to step S906. At this time, the score-maximized refine image has been stored in the refine image storing part 305.

In step S906, the important feature map generating part 311 acquires the inferring part structural information when the inferring part 303 infers the label with the score-maximized refine image as the input, and generates the gray-scaled important feature map based on the acquired inferring part structural information.

In step S907, the degradation scale map generating part 312 generates a degradation scale map based on the incorrect inference image and the score-maximized refine image.

In step S908, the superimposing part 313 generates an important feature index map based on the gray-scaled important feature map and the degradation scale map.

In step S909, the superpixel segmenting part 321 segments the incorrect inference image into superpixels and generates the superpixel segmentation information.

In step S910, the important superpixel determining part 322 adds up a pixel value of each pixel in the important feature index map for each superpixel. The important superpixel determining part 322 divides the added value calculated for each superpixel by the area of each superpixel, thereby calculating a normalized added value for each superpixel.

In step S911, the important superpixel determining part 322 defines changeable regions and unchangeable regions from the superpixels having normalized added values larger than or equal to the important feature index threshold.

Subsequently, in step S1001 in FIG. 10, the important superpixel determining part 322 reads a score-maximized refine image from the refine image storing part 305.

In step S1002, the important superpixel determining part 322 extracts an image section corresponding to the changeable region from the score-maximized refine image.

In step S1003, the important superpixel determining part 322 extracts an image section corresponding to the unchangeable region from the incorrect Inference image.

In step S1004, the important superpixel determining part 322 synthesizes the image section corresponding to the changeable region extracted from the score-maximized refine image and the image section corresponding to the unchangeable region extracted from the incorrect inference image, and generates a synthesis image.

In step S1005, the inferring part 303 infers a label with the synthesis image as an input and calculates the correct label score. The important superpixel evaluating part 323 acquires the correct label score calculated by the inferring part 303.

In step S1006, the important superpixel determining part 322 determines whether or not the important feature index threshold has reached the lower limit value. In step S1006, when the important superpixel determining part 322 determines that the important feature index threshold has not reached the lower limit value yet (No in step S1006), the process proceeds to step S1007.

In step S1007, the important superpixel determining part 322 lowers the important feature index threshold, and then the process returns to step S911 in FIG. 9.

On the other hand, in step S1006, when the important superpixel determining part 322 determines that the important feature index threshold has reached the lower limit value (Yes in step S1006), the process proceeds to step S1008.

In step S1008, the important superpixel evaluating part 323 specifies a combination of superpixels (changeable region) that causes incorrect inference based on the acquired correct label score, and outputs the specified combination as the incorrect inference cause information.

<Specific Example of incorrect Inference Cause Extracting Process>

Figure 11:
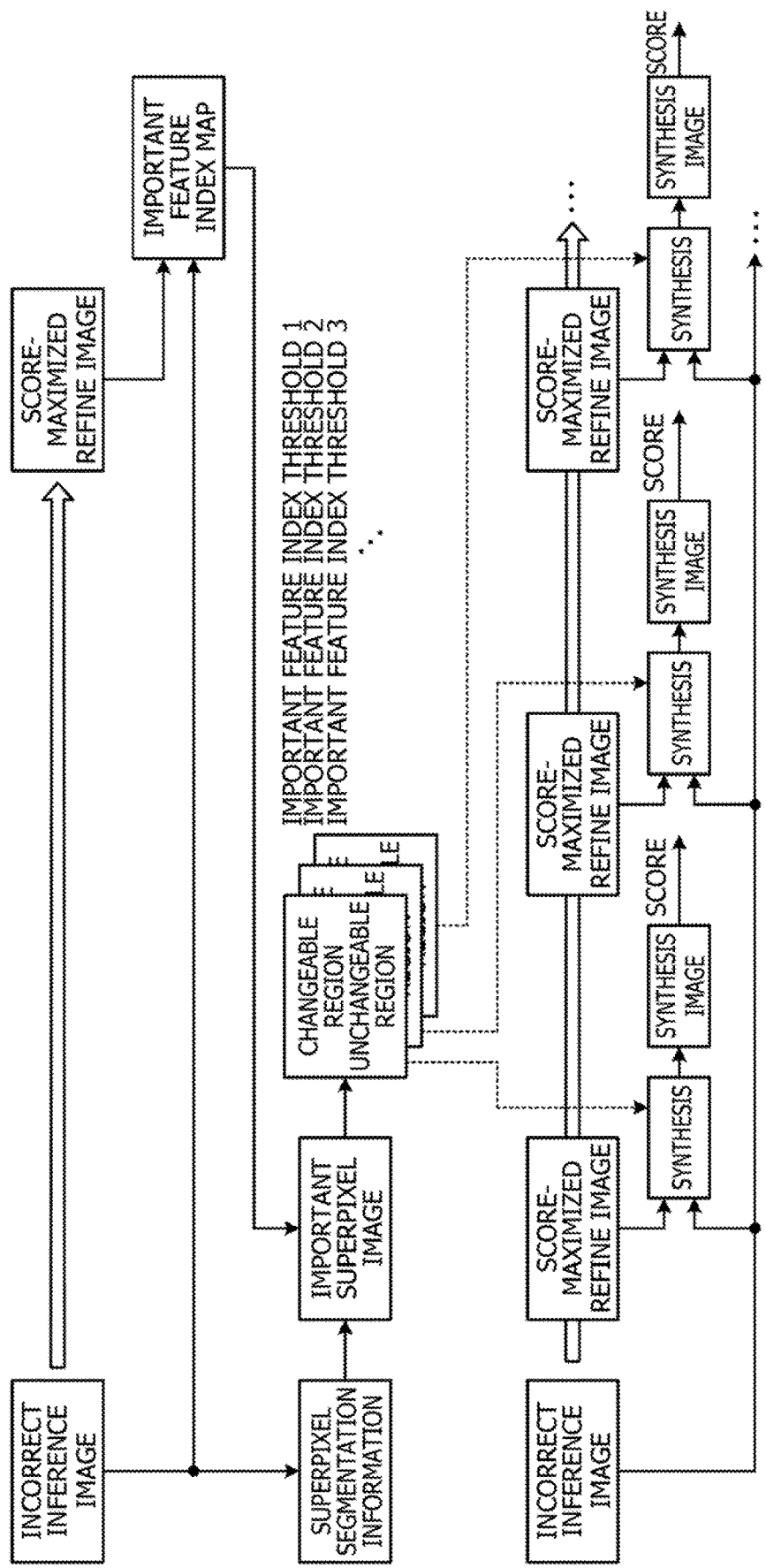
FIG. 11 is a first diagram illustrating a specific example of the incorrect inference cause extracting process.

Next, a specific example of the incorrect inference cause extracting process is described. FIG. 11 is a first diagram illustrating the specific example of the incorrect inference cause extracting process.

As illustrated in FIG. 11, first, when the refine image generating section 141 generates a score-maximized refine image from an incorrect inference image, the map generating section 142 generates an important feature index map.

Subsequently, when the superpixel segmenting part 321 generates superpixel segmentation information based on the incorrect inference image, the important superpixel determining part 322 generates an important superpixel image having normalized added values calculated for each superpixel.

Subsequently, the important superpixel determining part 322 defines changeable regions and unchangeable regions in the important superpixel image based on the important feature index threshold. The important superpixel determining part 322 generates a plurality of sets of changeable regions and unchangeable regions, by changing the important feature index threshold and changing the combination of superpixels selected from the superpixels that exceed the important feature index threshold. The important superpixel determining part 322 generates a synthesis image, using the generated plurality of sets of changeable regions and unchangeable regions.

Subsequently, the important superpixel evaluating part 323 inputs the generated synthesis image and acquires the correct label score inferred by the inferring part 303. As such, the important superpixel evaluating part 323 specifies a combination of superpixels (changeable region) that causes incorrect inference based on the acquired correct label scores and outputs the specified combination as the incorrect inference cause information.

As is clear from the above description, the analysis apparatus 100 according to the first embodiment generates the score-maximized refine image having the maximized correct label score of inference, from the incorrect inference image by which an incorrect label is inferred in the image recognition process.

Based on the inferring part structural information at the time of generating the score-maximized refine image, the analysis apparatus 100 according to the first embodiment generates a gray-scaled important feature map indicating a degree of attention of each of the pixels that has drawn attention at the time of inference, of the plurality of pixels of the score-maximized refine image.

The analysis apparatus 100 according to the first embodiment generates a degradation scale map that indicates the degree of change of the pixel that is changed when the score-maximized refine image is generated, based on a difference between the score-maximized refine image and the incorrect inference image.

The analysis apparatus 100 according to the first embodiment superimposes the gray-scaled important feature map and the degradation scale map and thereby generates an important feature index map that indicates the degree of importance of each pixel for inferring a correct label.

The analysis apparatus 100 according to the first embodiment generates superpixels by segmenting an incorrect inference image, adds up each pixel value in the important feature index map for each superpixel, and then calculates a normalized added value by dividing the added value by the area of each superpixel.

The analysis apparatus 100 according to the first embodiment extracts superpixels having the normalized added values larger than or equal to the important feature index threshold, and defines a changeable region and an unchangeable region based on the combination of the superpixels selected from the extracted superpixels.

The analysis apparatus 100 according to the first embodiment infers a correct label by inputting, to the inferring part, the incorrect inference image in which the defined changeable region is replaced with the score-maximized refine image.

The analysis apparatus 100 according to the first embodiment infers the label for each synthesis image while changing the important feature index threshold and the combination of superpixels to be selected. The analysis apparatus 100 according to the first embodiment specifies a combination of superpixels (changeable region) that causes incorrect inference from each inferred correct label score.

As described above, in the first embodiment, the image section that causes the incorrect inference is specified for each superpixel for which the normalized added value is calculated, with reference to the effect of replacement. As such, according to the first embodiment, it is possible to improve the precision at the time of specifying an image section that causes incorrect inference.

Second Embodiment

The above description is given of the case where, in the superpixel segmenting part 321 of the first embodiment, the segmenting portion 610 segments the incorrect inference image into element objects (vehicle components) as superpixels. However, the method of segmenting the incorrect inference image is not limited to thereto. For example, the incorrect inference image may be segmented into rectangular regions of the same size and the same shape, as superpixels. As a result, it is possible to suppress variations in the added value due to the difference in the area of each superpixel. Hereinafter, a second embodiment is described by focusing on a difference from the above-described first embodiment.

<Specific Example of Processing of Specifying Section>

First, specific examples of processing of the components of the specifying section 143 (the superpixel segmenting part 321 and the important superpixel determining part 322) are described.

(1) Specific Example of Processing of Superpixel Segmenting Part

Figure 12:
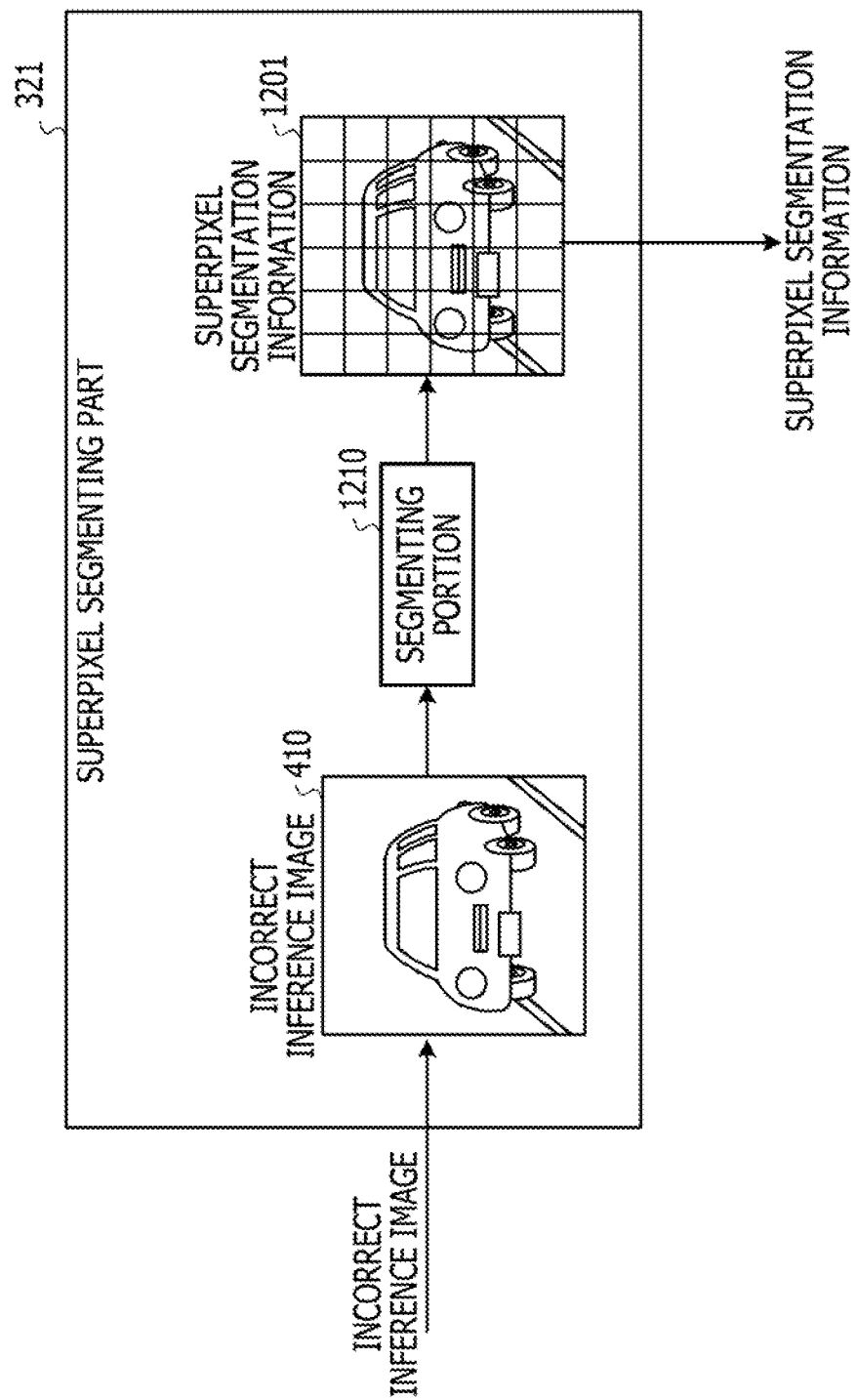
FIG. 12 is a second diagram illustrating a specific example of the processing of the superpixel segmenting part.

FIG. 12 is a second diagram illustrating a specific example of the processing of the superpixel segmenting part. As illustrated in FIG. 12, the superpixel segmenting part 321 includes a segmenting portion 1210. The segmenting portion 1210 of FIG. 12 is different from the segmenting portion 610 illustrated in FIG. 6 in segmenting the incorrect inference image 410 into rectangular regions of the same size and the same shape (segmenting method is arbitrary).

The rectangular regions segmented in the same size and the same shape may be regarded as a special mode of superpixels (regions segmented in different sizes and different shapes, such as element objects). Therefore, the segmented rectangular regions of the same size and the same shape are also hereinafter referred to as superpixels.

The superpixel segmenting part 321 outputs superpixel segmentation information 1201 generated by the segmentation into the rectangular regions of the same size and the same shape by the segmenting portion 1210.

(2) Specific Example of Processing of important Superpixel Determining Part

Figure 13:
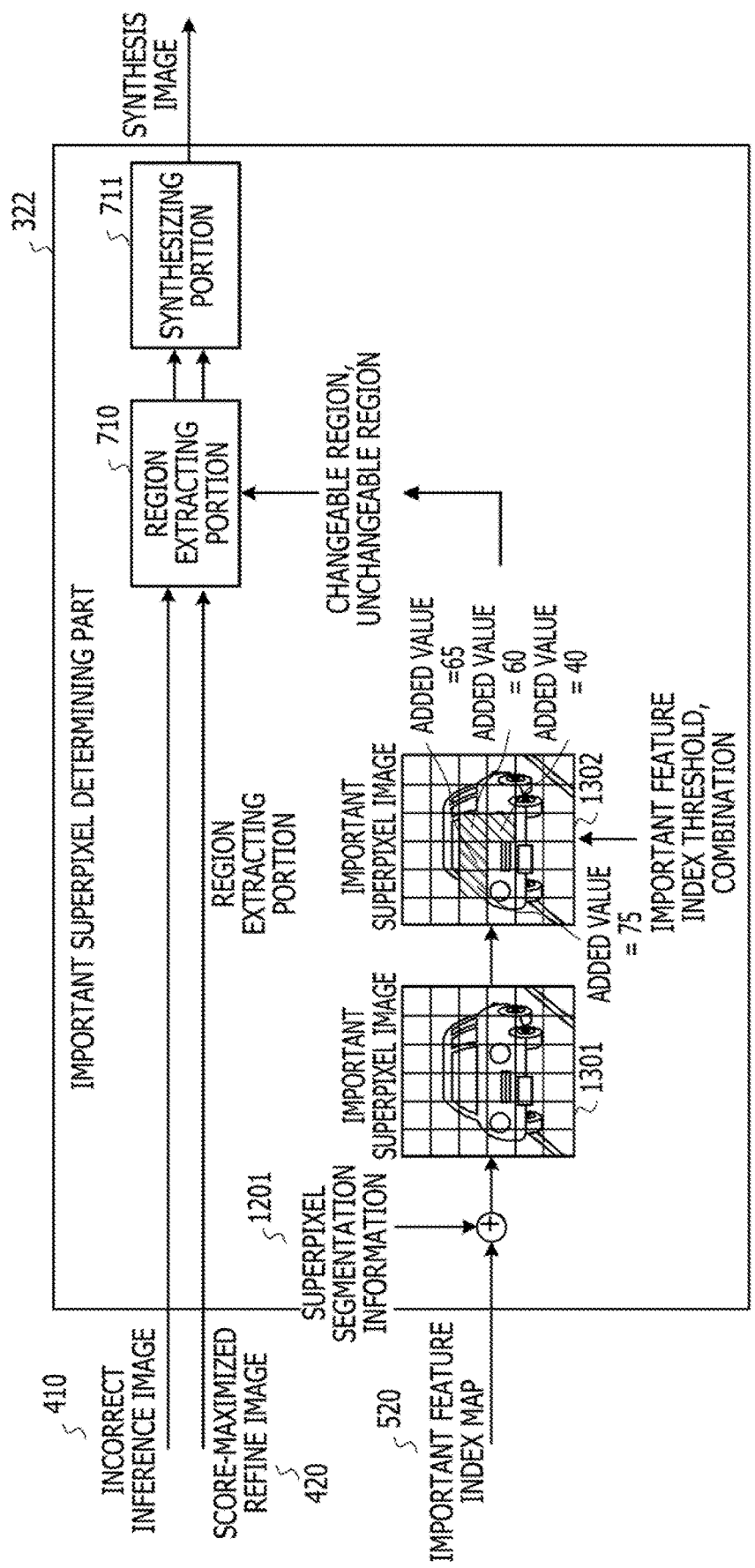
FIG. 13 is a second diagram illustrating a specific example of the processing of the important superpixel determining part.

Next, a specific example of the processing of the important superpixel determining part 322 included in the specifying section 143 is described. FIG. 13 is a second diagram illustrating the specific example of the processing of the important superpixel determining part.

As illustrated in FIG. 13, the important superpixel determining part 322 includes a region extracting portion 710 and a synthesizing portion 711.

The important superpixel determining part 322 superimposes the important feature index map 520 outputted from the superimposing part 313 and the superpixel segmentation information 1201 outputted from the superpixel segmenting part 321. As such, the important superpixel determining part 322 generates an important superpixel image 1301. FIG. 13 illustrates a case where an (inverted) important feature index map is used as the important feature index map 520.

The important superpixel determining part 322 adds up a pixel value of each pixel of the important feature index map 520 for each superpixel (rectangular region of the same size and the same shape) in the generated important superpixel image 1301. In FIG. 13, an important superpixel image 1302 clearly illustrates an example of the added value for each superpixel.

As illustrated in FIG. 13, in the case of the important superpixel image 1302, since each superpixel is the rectangular region of the same size and the same shape, the added value for each superpixel is equal to the normalized added value. For example, when the superpixels are the rectangular regions of the same size and the same shape, calculating the added value for each superpixel is equivalent to calculating the normalized added value for each superpixel as the added value of the pixel value for each region according to a predetermined index.

The important superpixel determining part 322 determines whether the added value for each superpixel is larger than or equal to the important feature index threshold, and extracts superpixels for which the added value is determined to be larger than or equal to the important feature index threshold.

The important superpixel determining part 322 combines the superpixels selected from the extracted superpixels, and defines the combined superpixels as the changeable region. The shaded area included in the important superpixel image 1302 in FIG. 13 is an example of the changeable region. The important superpixel determining part 322 defines the superpixels other than the combined superpixels as an unchangeable region. The important superpixel determining part 322 notifies the region extracting portion 710 of the defined changeable region and unchangeable region.

The region extracting portion 710 extracts an image section corresponding to the unchangeable region from the incorrect inference image 410 and extracts an image section corresponding to the changeable region from the score-maximized refine image 420.

The synthesizing portion 711 synthesizes the image section corresponding to the changeable region extracted from the score-maximized refine image 420, and the image section corresponding to the unchangeable region extracted from the incorrect inference image 410 and generates a synthesis image.

Figure 14:
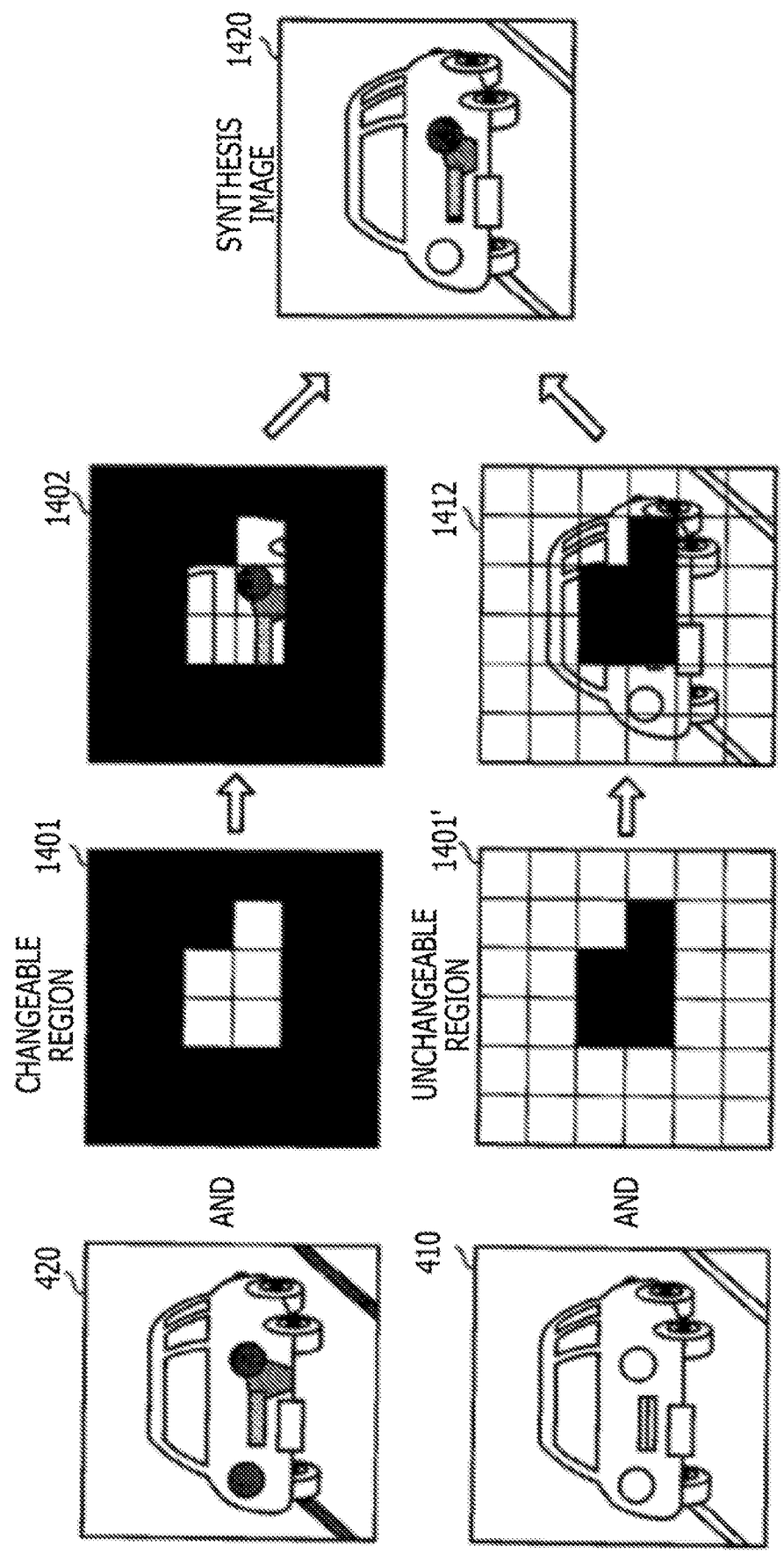
FIG. 14 is a second diagram illustrating a specific example of the processes of the region extracting portion and the synthesizing portion.

FIG. 14 is a second diagram illustrating a specific example of the processes of the region extracting portion and the synthesizing portion. In FIG. 14, the upper column illustrates a case where the region extracting portion 710 extracts an image section corresponding to a changeable region 1401 (white portion) from the score-maximized refine image 420.

On the other hand, in FIG. 14, the lower column illustrates a case where the region extracting portion 710 extracts an image section corresponding to an unchangeable region 1401' (white portion) from the incorrect inference image 410. The unchangeable region 1401' is obtained by inverting the white portion and the black portion of the changeable region 1401 (for the sake of explanation, in the lower column of FIG. 14, the white portion represents the unchangeable region).

As illustrated in FIG. 14, the synthesizing portion 711 synthesizes the image section corresponding to the changeable region 1401 in the score-maximized refine image 420 and the image section corresponding to the unchangeable region 1401' in the incorrect inference image 410, and generates a synthesis image 1420.

Thus, the specifying section 143 adds up the pixel values of the important feature index map 520 for each equally-segmented superpixel, thereby making it possible to extract the superpixel that serves as the changeable region without performing a normalization operation.

<Flow of incorrect Inference Cause Extracting Process>

Next, flow of an incorrect inference cause extracting process performed by the incorrect inference cause extracting unit 140 is described. FIG. is a third flowchart illustrating the flow of the incorrect inference cause extracting process. In the second embodiment, the incorrect inference cause extracting unit 140 performs the incorrect inference cause extracting process by executing the third flowchart illustrated in FIG. 15 and the second flowchart illustrated in FIG. 10.

Figure 15:
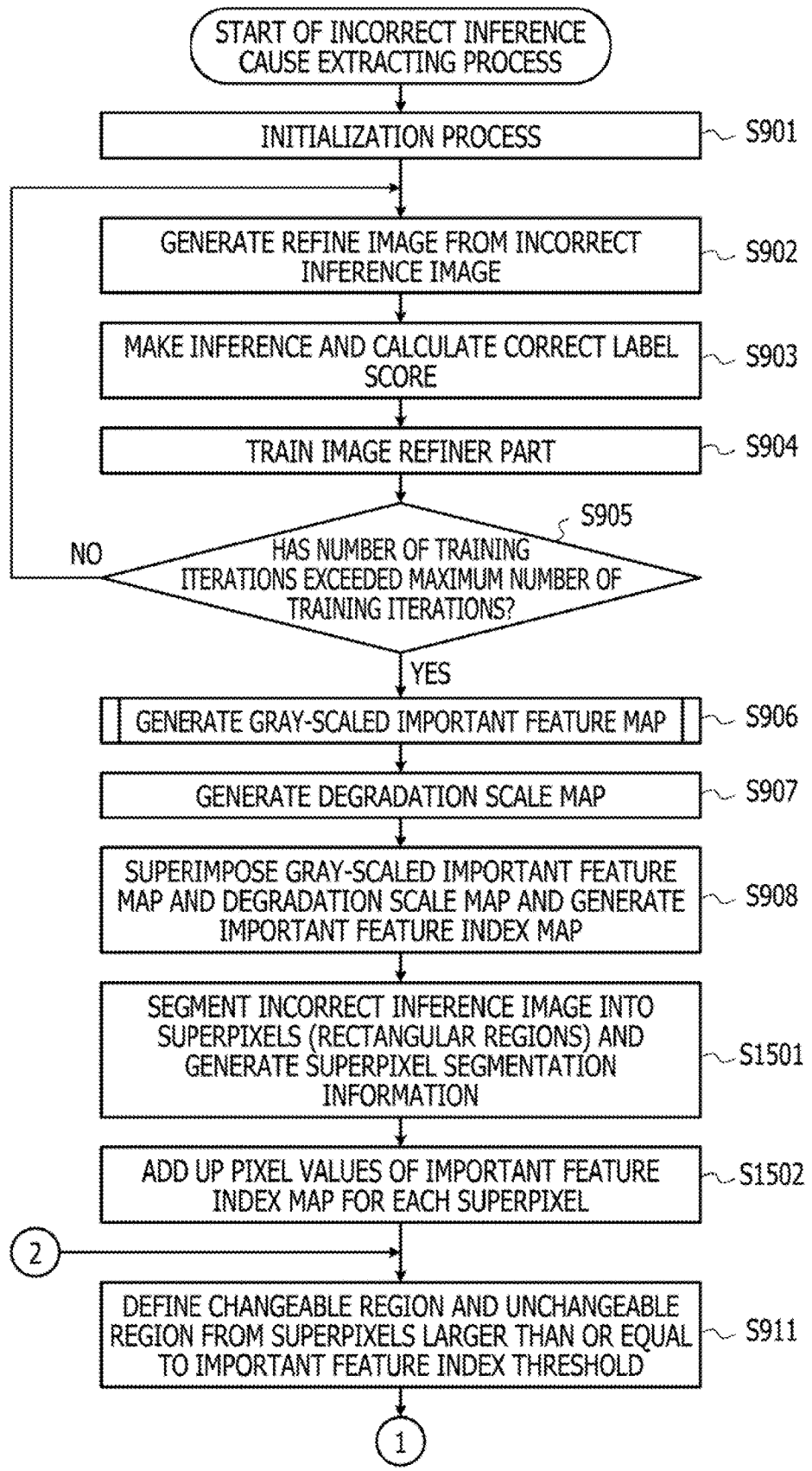
FIG. 15 is a third flowchart illustrating a flow of a detailed cause extracting process.

Among the steps of the third flowchart illustrated in FIG. 15, differences from the first flowchart illustrated in FIG. 9 are steps S1501 and S1502. Therefore, steps S1501 and S1502 are described.

In step S1501, the superpixel segmenting part 321 segments the incorrect inference image into superpixels (rectangular regions of the same size and the same shape) and generates superpixel segmentation information.

In step S1502, the important superpixel determining part 322 adds up pixel values in the important feature index map for each superpixel.

As is clear from the above description, the analysis apparatus 100 according to the second embodiment generates superpixels by segmenting the incorrect inference image into rectangular regions of the same size and the same shape. The analysis apparatus 100 according to the second embodiment adds up each pixel value in the important feature index map for each superpixel.

Thus, according to the second embodiment, it is possible to further benefit from the effect of being able to calculate the normalized added value without performing any normalization operation compared with the first embodiment, while maintaining the same effect as the first embodiment.

Third Embodiment

In the aforementioned first and second embodiments, the description is given of the case where the changeable region and the unchangeable region are defined for each superpixel. However, the method of defining the changeable region and the unchangeable region is not limited thereto, and a fine adjustment block may be generated by further fragmenting the changeable region, for example, and the changeable region and the unchangeable region may be defined for each fine adjustment block. Hereinafter, a third embodiment is described mainly in terms of differences from the aforementioned first and second embodiments.

<Functional Configuration of incorrect Inference Cause Extracting Unit>

First, a functional configuration of an incorrect inference cause extracting unit 140 in an analysis apparatus 100 according to the third embodiment is described in detail.

Figure 16:
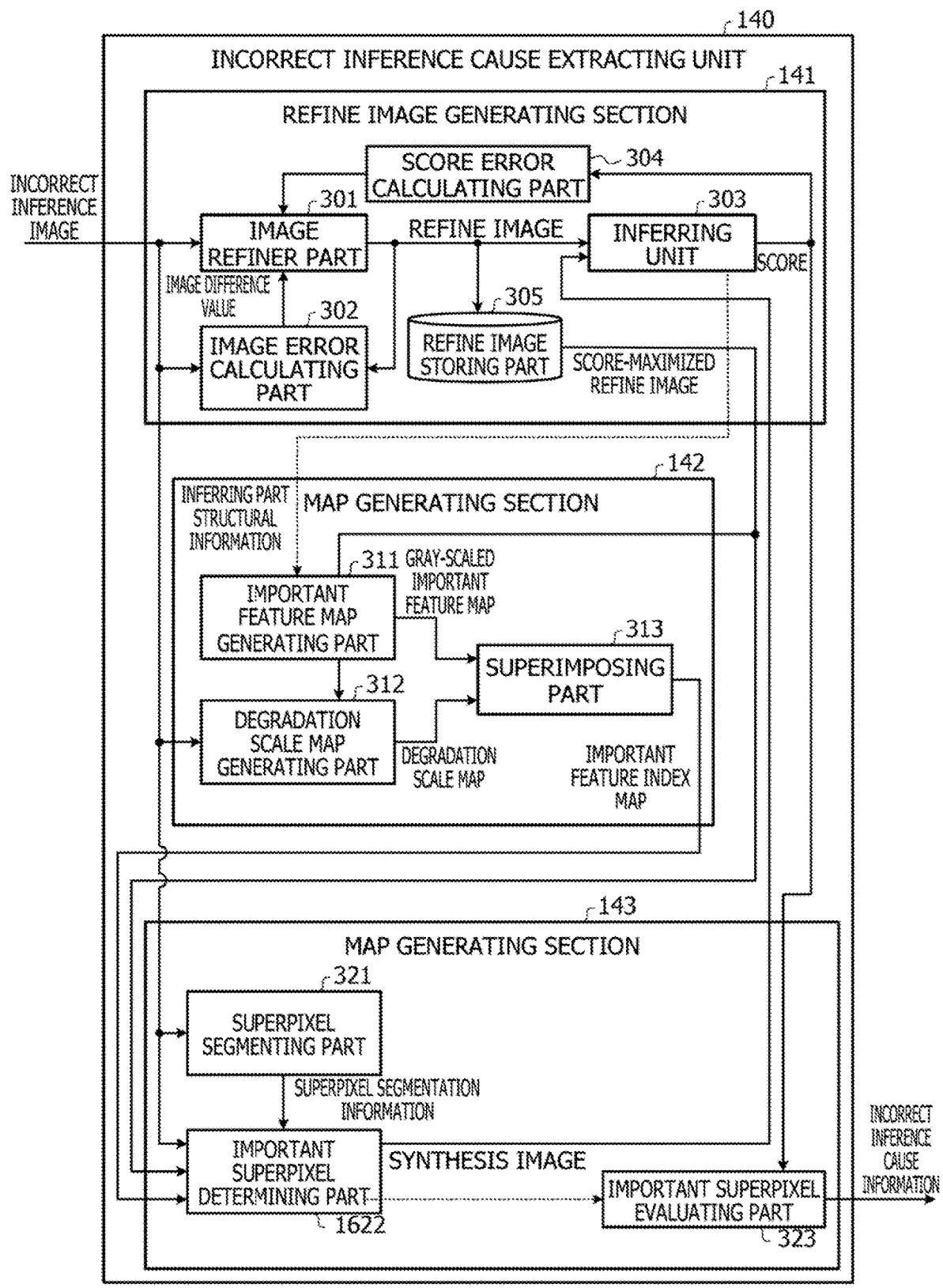
FIG. 16 is a second diagram illustrating an example of the functional configuration of the incorrect inference cause extracting unit.

FIG. 16 is a second diagram illustrating an example of the functional configuration of the incorrect inference cause extracting unit. The difference from the functional configuration of the incorrect inference cause extracting unit 140 illustrated in FIG. 3 is an important superpixel determining part 1622.

In the case of the important superpixel determining part 1622 illustrated in FIG. 16, when the generated synthesis image is inputted to the inferring part 303 and the score is outputted from the inferring part 303, the score is acquired and used to generate the next synthesis image. The processing of the important superpixel determining part 1622 is described in detail later with reference to FIGS. 17 and 18.

<Specific Example of Processing of important Superpixel Determining Part>

Figure 17:
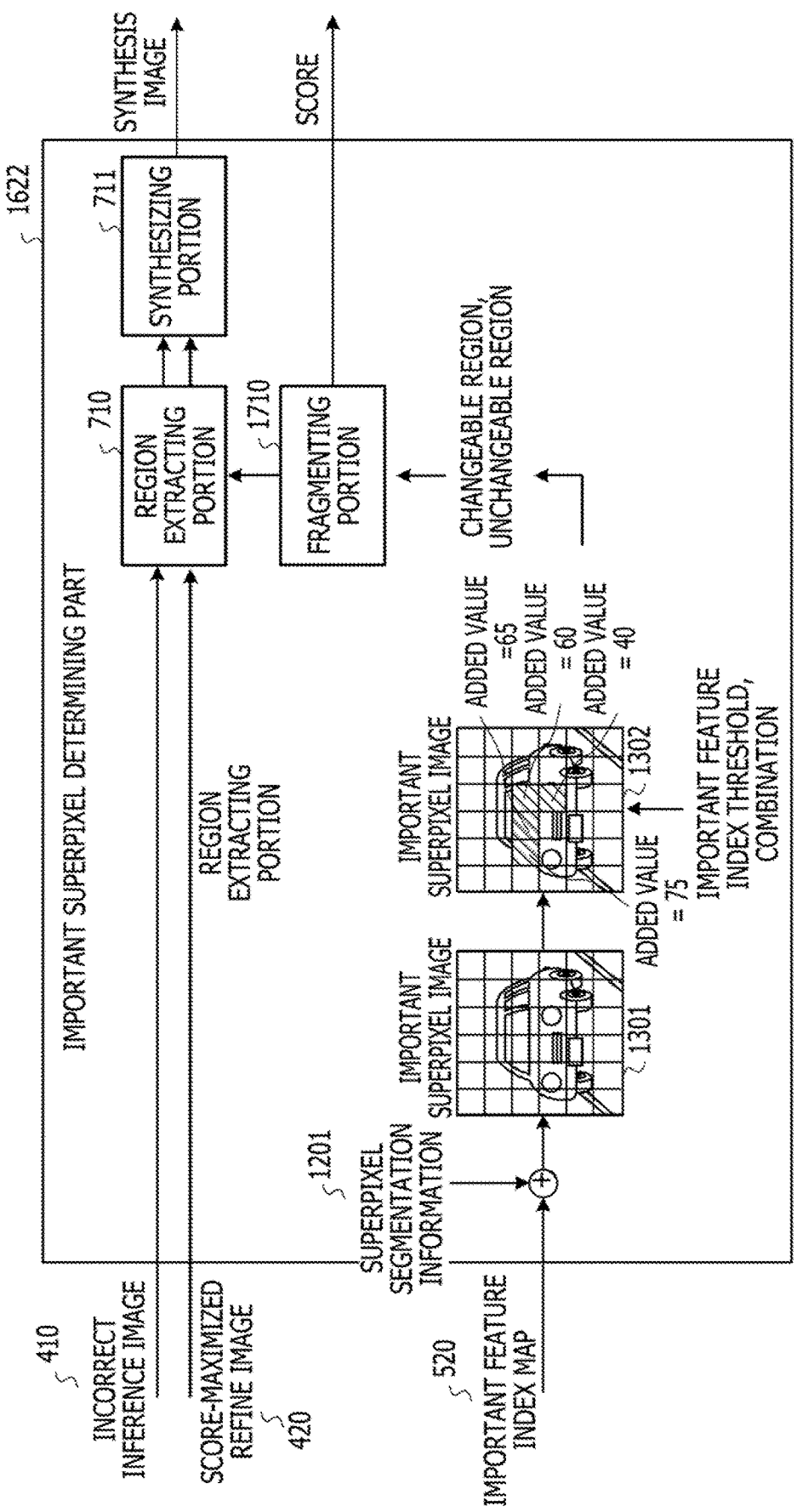
FIG. 17 is a third diagram illustrating a specific example of the processing of the important superpixel determining part.

Next, a specific example of the processing of the important superpixel determining part 1622 is described. FIG. 17 is a third diagram illustrating the specific example of the processing of the important superpixel determining part. The difference from FIG. 13 is a fragmenting portion 1710.

The fragmenting portion 1710 fragments the defined changeable region to generate fine adjustment blocks. The fragmenting portion 1710 changes some of the fine adjustment blocks generated in the changeable region from the changeable regions to the unchangeable regions so that the image section that causes incorrect inference is specified with finer granularity.

The fragmenting portion 1710 refers to the score acquired from the inferring part 303 when changing some of the fine adjustment blocks in the changeable region from the changeable regions to the unchangeable regions.

Figure 18:
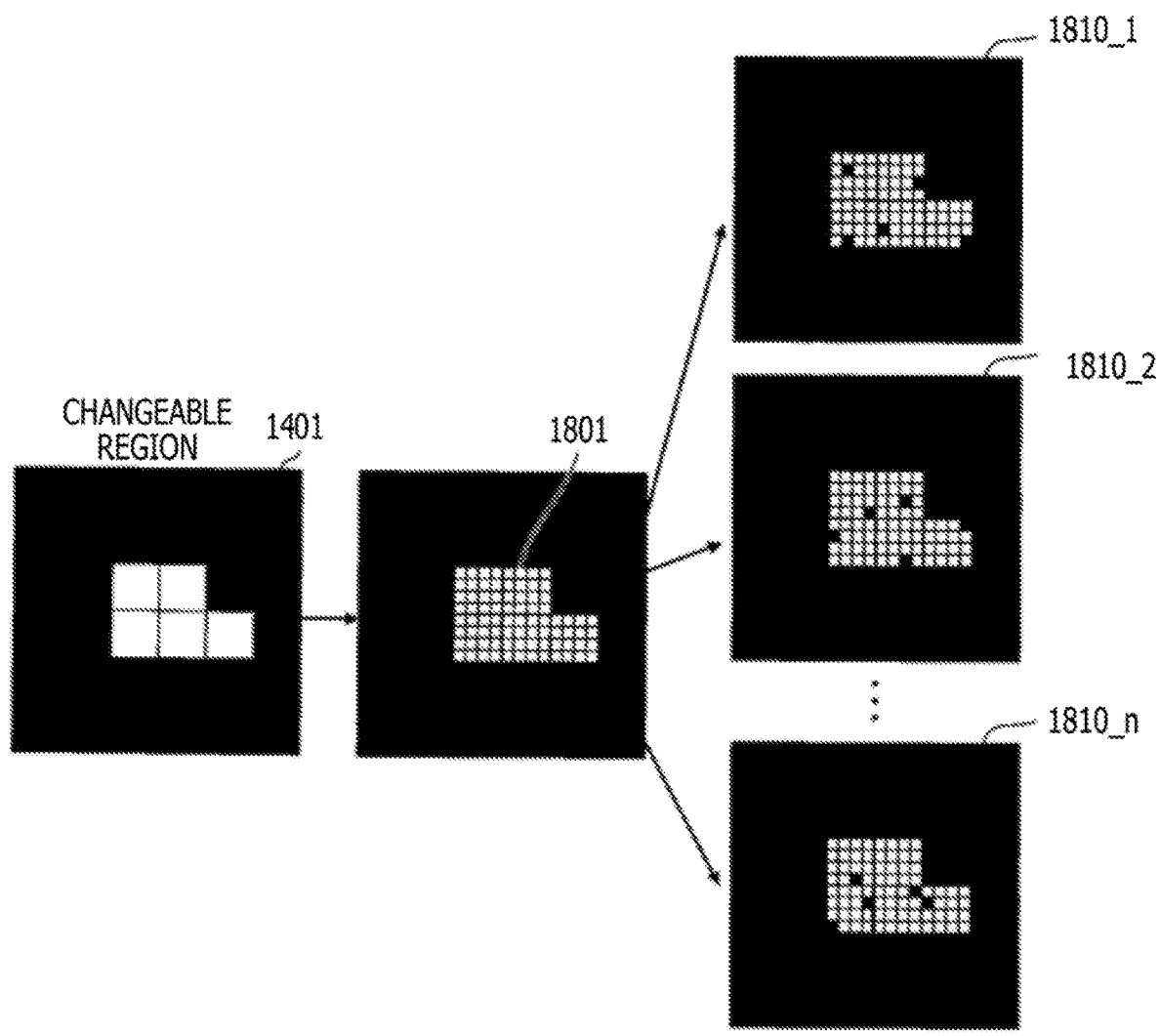
FIG. 18 is a first diagram illustrating a specific example of processing of a fragmenting portion.

FIG. 18 is a diagram illustrating a specific example of processing of the fragmenting portion. As illustrated in FIG. 18, the fragmenting portion 1710 fragments the changeable region 1401 (white portion) to generate fine adjustment blocks 1801.

The fragmenting portion 1710 changes some of the fine adjustment blocks 1801 from the changeable regions to the unchangeable regions. The fragmenting portion 1710 notifies the region extracting portion 710 of the changeable region excluding some of the fine adjustment blocks 1801 and the unchangeable region including some of the fine adjustment blocks 1801 (hereinafter referred to as the finely adjusted changeable regions and the finely adjusted unchangeable regions).

The fragmenting portion 1710 acquires a score from the inferring part 303 in response to the notification of the finely adjusted changeable regions and the finely adjusted unchangeable regions (see reference numeral 1810_1 in FIG. 18). The fragmenting portion 1710 also changes, based on the acquired score, some of the fine adjustment blocks from the changeable regions to the unchangeable regions, and notifies the region extracting portion 710 of the finely adjusted changeable regions and the finely adjusted unchangeable regions (for example, reference numeral 1810_2 in FIG. 18).

The example of FIG. 18 illustrates that the fragmenting portion 1710 has repeated these processes (fine adjustment process) n times. As such, by defining the finely adjusted changeable regions and unchangeable regions, it is possible to specify the image section that causes incorrect inference with finer granularity. The fragmenting portion 1710 executes the above-described fine adjustment process every time the definition of the changeable regions and the unchangeable regions is updated as the important feature index threshold or the combination of superpixels to be selected is changed.

Figure 19:
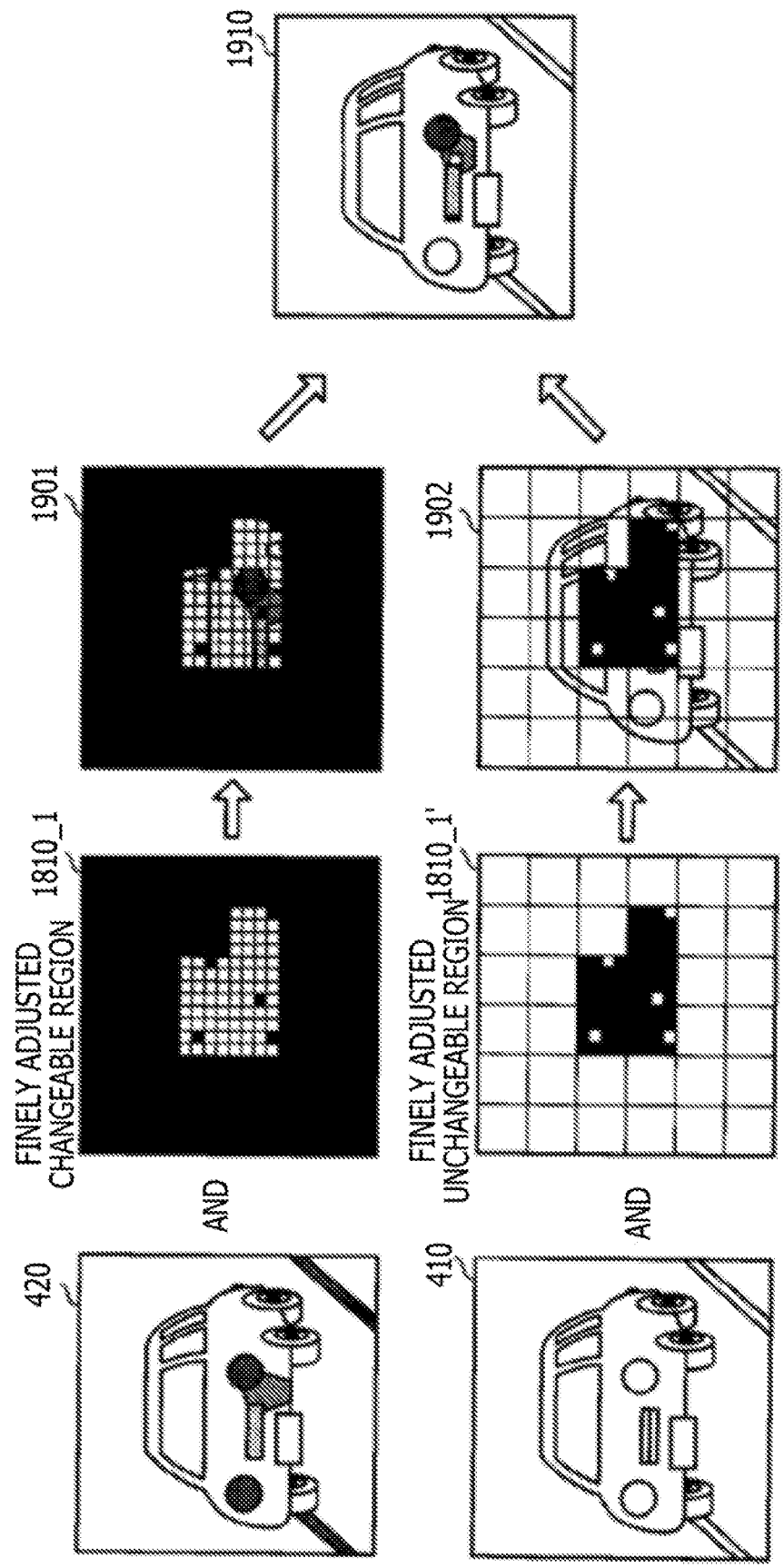
FIG. 19 is a third diagram illustrating a specific example of the processes of the region extracting portion and the synthesizing portion.

FIG. 19 is a third diagram illustrating a specific example of the processes of the region extracting portion and the synthesizing portion. In FIG. 19, the upper column illustrates a case where the region extracting portion 710 extracts an image section corresponding to the finely adjusted changeable region 18101 (white portion) from the score-maximized refine image 420.

On the other hand, in FIG. 19, the lower column illustrates a case where the region extracting portion 710 extracts an image section corresponding to the finely adjusted unchangeable region 1810_1' (white portion) from the incorrect inference image 410. The finely adjusted unchangeable region 1810_1' is obtained by inverting the white portion and the black portion of the finely adjusted changeable region 1810_1 (for the sake of explanation, in the lower column of FIG. 19, the white portion represents the finely adjusted unchangeable region).

As illustrated in FIG. 19, the synthesizing portion 711 synthesizes an image section 1901 corresponding to the finely adjusted changeable region 1810_1 in the score-maximized refine image 420 and an image section 1902 corresponding to the finely adjusted unchangeable region 1810_1' in the incorrect inference image 410. Thus, the synthesizing portion 711 generates a synthesis image 1910.

As such, the specifying section 143 makes it possible to specify a region to be replaced with the score-maximized refine image 420 for each superpixel and for each fine adjustment block when generating the synthesis image 1910.

<Specific Example of incorrect Inference Cause Extracting Process>

Figure 20:
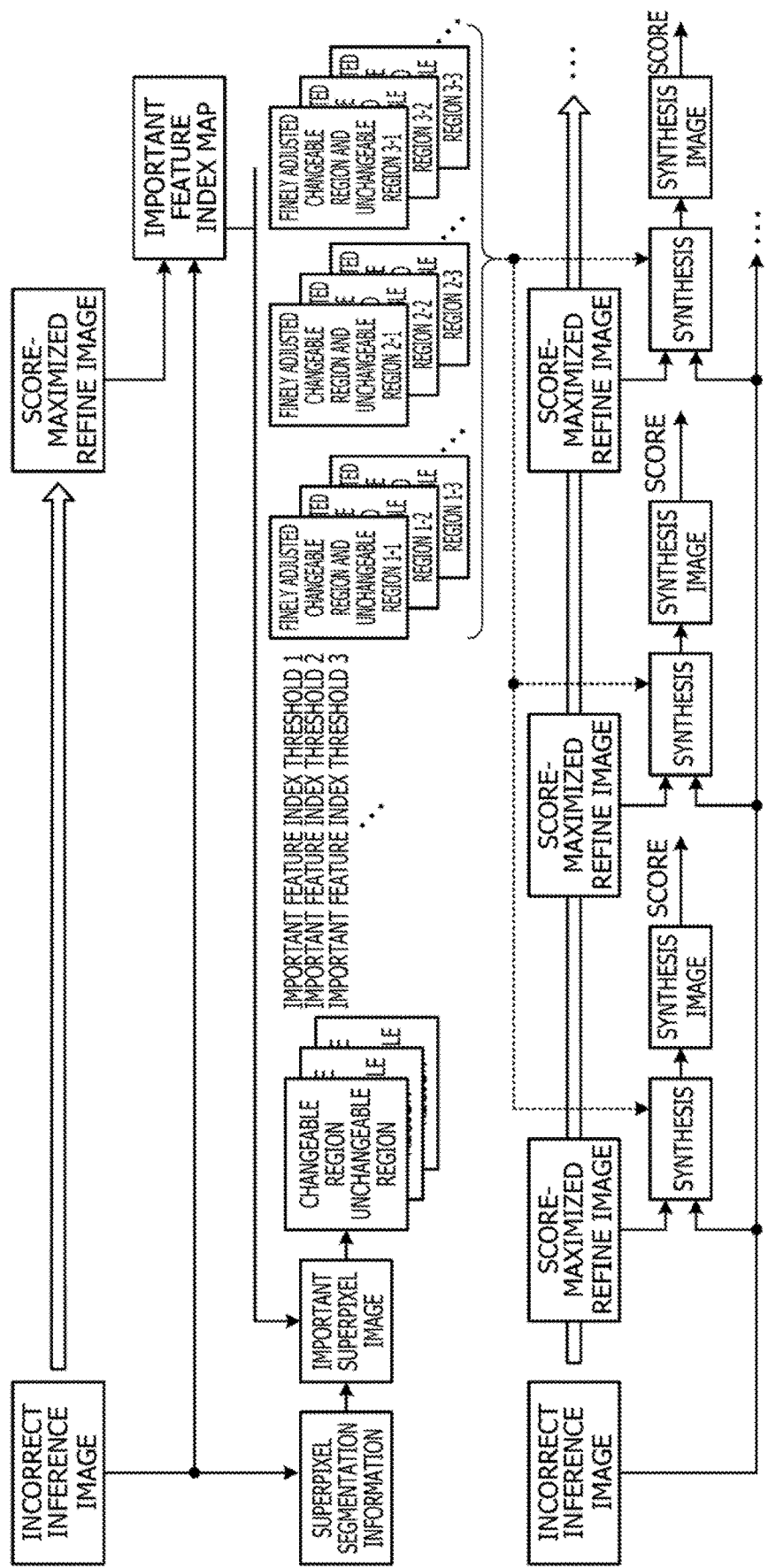
FIG. 20 is a second diagram illustrating a specific example of the incorrect inference cause extracting process.

Next, a specific example of the incorrect inference cause extracting process is described. FIG. 20 is a second diagram illustrating the specific example of the incorrect inference cause extracting process.

In the specific example of the incorrect inference cause extracting process illustrated in FIG. 20, the processing up to defining the changeable region and the unchangeable region is the same as that in the specific example of the incorrect inference cause extracting process illustrated in FIG. 11, and thus description of the processing up to defining the changeable region and the unchangeable region is omitted.

As illustrated in FIG. 20, when a plurality of sets of changeable regions and unchangeable regions are generated, the important superpixel determining part 322 performs a fine adjustment process for each set. In FIG. 20, a plurality of finely adjusted changeable regions and unchangeable regions that are superimposed on the finely adjusted changeable region and unchangeable region 1-1 represent that the fine adjustment processes are performed multiple times for the corresponding set of changeable regions and unchangeable regions.

Likewise, in FIG. 20, a plurality of finely adjusted changeable regions and unchangeable regions that are superimposed on the finely adjusted changeable region and unchangeable region 2-1 represent that the fine adjustment processes are performed multiple times for the corresponding other set of changeable regions and unchangeable regions.

Likewise, in FIG. 20, a plurality of finely adjusted changeable regions and unchangeable regions that are superimposed on the finely adjusted changeable region and unchangeable region 3-1 represent that the fine adjustment processes are performed multiple times for the corresponding other set of changeable regions and unchangeable regions.

As illustrated in FIG. 20, the important superpixel determining part 322 generates a synthesis image every time the fine adjustment process is performed. The important superpixel determining part 322 acquires the correct label score every time the inferring part 303 makes inference with the generated synthesis image as an input. As such, the important superpixel determining part 322 may proceed with the fine adjustment process while referring to the correct label score.

The important superpixel evaluating part 323 acquires the correct label score every time the inferring part 303 makes inference with the generated synthesis image as an input. As such, the important superpixel evaluating part 323 specifies a combination of superpixels (changeable region) and a combination of fine adjustment blocks (finely adjusted changeable region) that cause incorrect inference based on the acquired correct label scores. The important superpixel evaluating part 323 outputs the specified combination of superpixels and combination of fine adjustment blocks as the incorrect inference cause information.

<Flow of incorrect Inference Cause Extracting Process>

Figure 21:
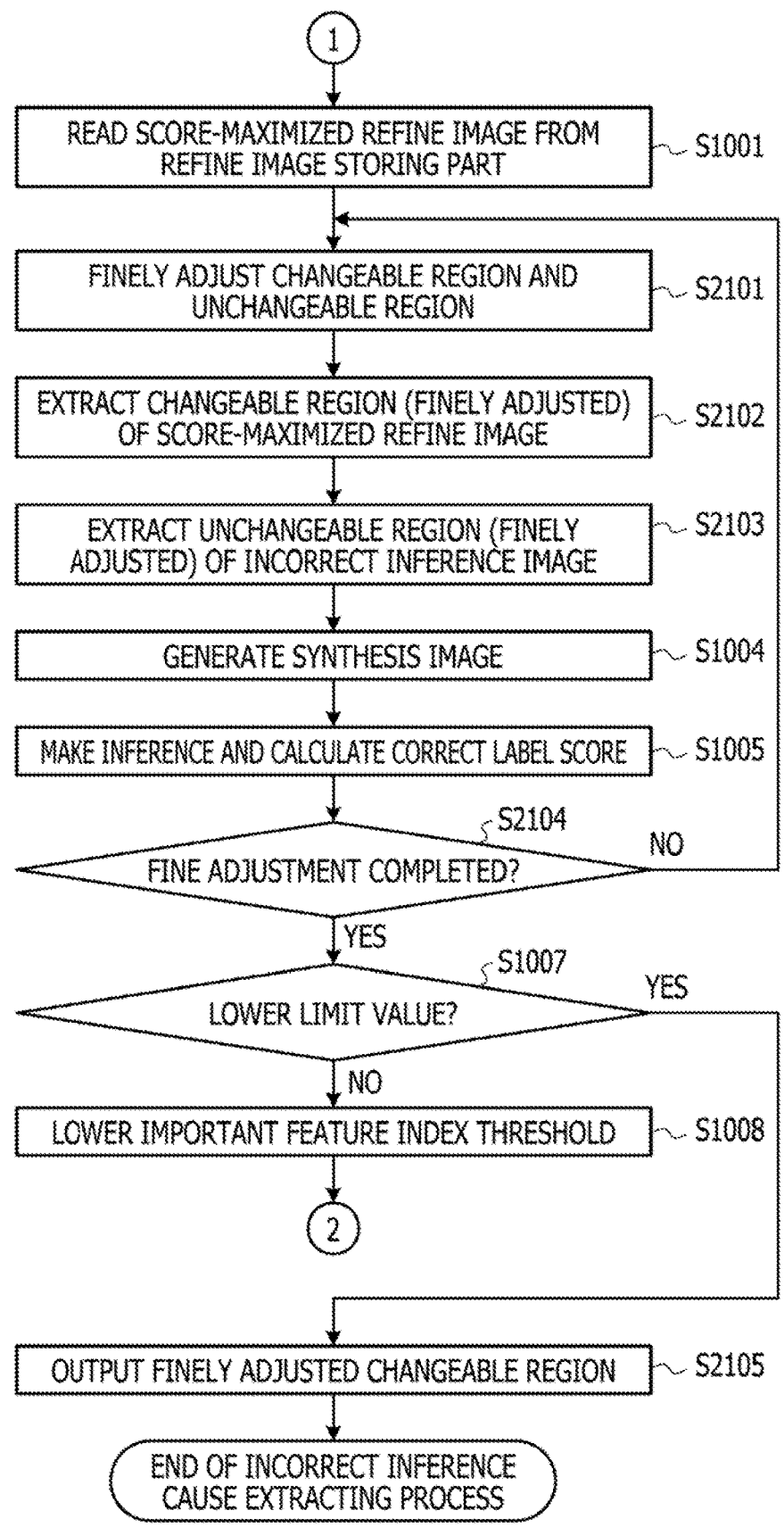
FIG. 21 is a fourth flowchart illustrating the flow of the incorrect inference cause extracting process.

Next, flow of an incorrect inference cause extracting process performed by the incorrect inference cause extracting unit 140 is described. FIG. 21 is a fourth flowchart illustrating the flow of the incorrect inference cause extracting process. In the third embodiment, the incorrect inference cause extracting unit 140 performs the incorrect inference cause extracting process by executing the third flowchart illustrated in FIG. 15 and the fourth flowchart illustrated in FIG. 21.

Among the steps of the fourth flowchart illustrated in FIG. 21, differences from the second flowchart illustrated in FIG. 10 are steps S2101 to S2103 and steps S2104 and S2105. Steps S2101 to S2103 and steps S2104 and S2105 are described.

In step S2101, the fragmenting portion 1710 fragments the changeable region to generate fine adjustment blocks, and changes some of the fine adjustment blocks from changeable regions to unchangeable regions, thereby generating finely adjusted changeable regions and finely adjusted unchangeable regions.

In step S2102, the region extracting portion 710 extracts an image section corresponding to the finely adjusted changeable region from the score-maximized refine image.

In step S2103, the region extracting portion 710 extracts an image section corresponding to the finely adjusted unchangeable region from the incorrect Inference image.

In step S2104, the fragmenting portion 1710 determines whether or not to finish the fine adjustment process. When the fragmenting portion 1710 determines not to finish the fine adjustment process in step S2104 (No in step S2104), the process returns to step S2101.

On the other hand, when the fragmenting portion 1710 determines to finish the fine adjustment process in step S2104 (Yes in step S2104), the process proceeds to step S1007.

In step S2105, the important superpixel evaluating part 323 specifies a combination of superpixels and a combination of fine adjustment blocks that cause incorrect inference based on the acquired correct label score. The important superpixel evaluating part 323 outputs the specified combination of superpixels and combination of fine adjustment blocks as the incorrect inference cause information.

As is clear from the above description, the analysis apparatus 100 according to the third embodiment fragments the changeable region to generate the fine adjustment blocks, and changes some of the fine adjustment blocks from changeable regions to unchangeable regions.

As such, according to the third embodiment, it is possible to specify the image section that causes incorrect Inference with finer granularity, compared with the aforementioned first and second embodiments, while maintaining the same effects as those of the first and second embodiments.

Fourth Embodiment

In the aforementioned third embodiment, the description is given of the case where some of the fine adjustment blocks in the changeable region are changed from the changeable regions to the unchangeable regions while referring to the score of the inferring part 303. However, the procedure for changing some of the fine adjustment blocks in the changeable region from the changeable regions to the unchangeable regions is not limited thereto.

For example, each pixel value of the important feature index map may be added for each fine adjustment block, and the fine adjustment blocks to be changed from the changeable regions to the unchangeable regions may be determined based on the added value for each fine adjustment block.

Figure 22:
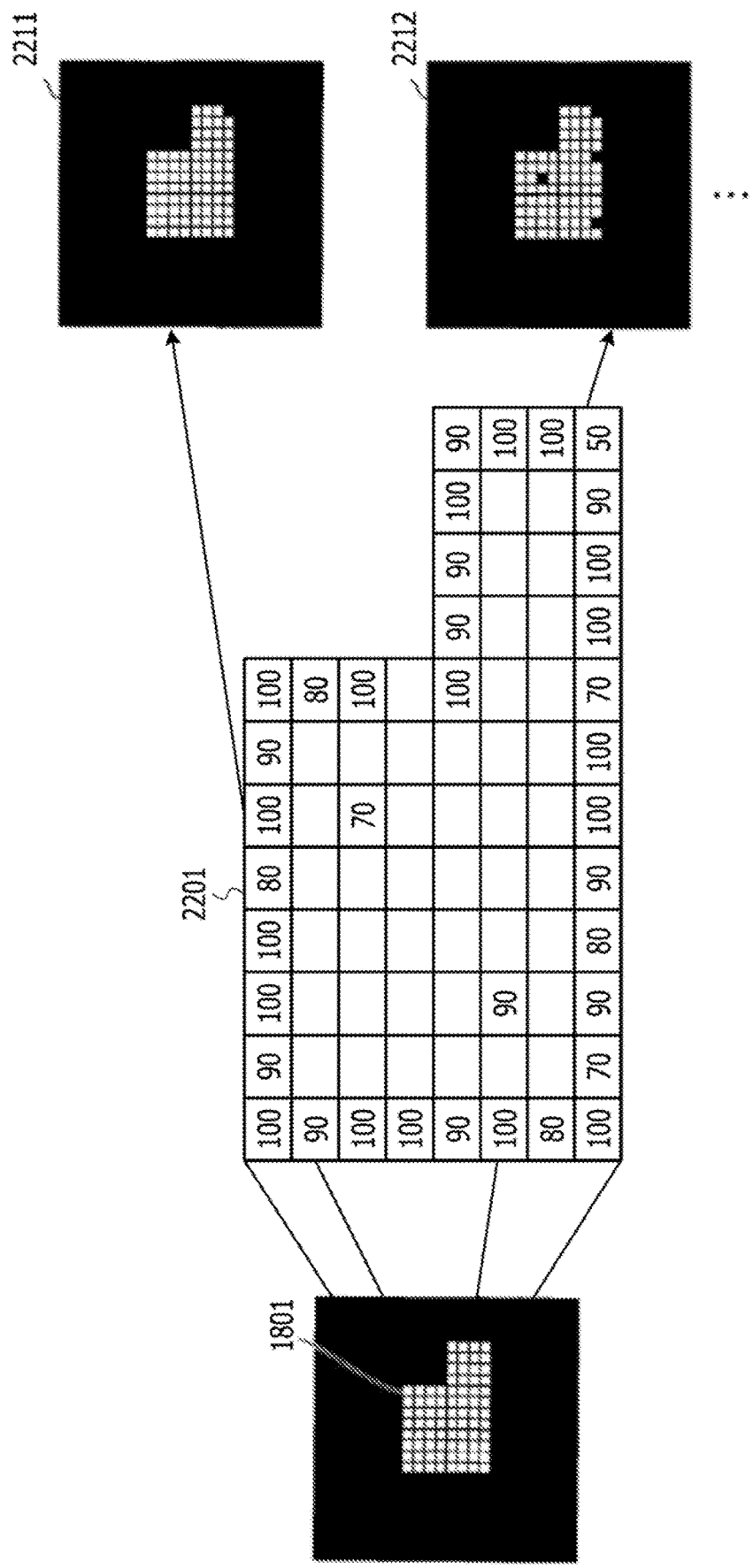
FIG. 22 is a second diagram illustrating a specific example of the processing of the fragmenting portion.

FIG. 22 is a second diagram illustrating a specific example of the processing of the fragmenting portion. As illustrated in FIG. 22, the fragmenting portion 1710 fragments a changeable region to generate fine adjustment blocks 1801.

Subsequently, the fragmenting portion 1710 adds up each pixel value of the important feature index map for each of the generated fine adjustment blocks 1801 to obtain an added value 2201. Then, the fragmenting portion 1710 specifies the smallest fine adjustment block in the added value 2201, and changes the specified fine adjustment block from the changeable region to the unchangeable region.

In FIG. 22, the finely adjusted changeable region and the finely adjusted unchangeable region 2211 represent a case where the fine adjustment block having the smallest added value is changed from the changeable region to the unchangeable region. Likewise, the finely adjusted changeable region and the finely adjusted unchangeable region 2212 represent a case where the fine adjustment block having the smallest added value and the fine adjustment block having the second smallest added value are changed from the changeable regions to the unchangeable regions.

As such, by performing the fine adjustment process based on the added value for each fine adjustment block, it is possible to specify the image section that causes incorrect inference in a short time, as compared with the aforementioned third embodiment.

Fifth Embodiment

In the aforementioned third and fourth embodiments, the description is given of the case where, when the superpixels are rectangular regions of the same size and the same shape, the changeable region is fragmented to generate the fine adjustment blocks. However, the changeable region may also be fragmented to generate the fine adjustment blocks even when the superpixels are regions for each element object (vehicle component).

The present invention is not limited to the configurations illustrated herein while the configurations exemplified according to the aforementioned embodiments may also be combined with other elements, for example. These aspects may be changed without departing from the gist of the present invention and appropriately set in accordance with applied modes thereof.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An analysis apparatus comprising:
a memory configured to store program instructions; and
a processor coupled to the memory, the processor being configured to execute the program instructions stored in the memory, the program instructions including:
executing an image generating processing configured to generate a refine image having a maximized correct label score of inference from an incorrect inference image from which an incorrect label is inferred by a neural network;
executing a map generating processing configured to generate a third map by superimposing a first map and a second map, the first map indicating pixels to each of which a change is made in generating the refine image, of a plurality of pixels in the incorrect inference image, the second map indicating a degree of attention for each local region in the refine image, the each local region being a region that has drawn attention at the time of inference by the neural network, and the third map indicating a degree of importance for each of the pixels for inferring a correct label; and
executing a specifying processing configured to
obtain an added value for respective divided region in the third map by summing pixel values within the respective divided region, the respective divided region being a region divided according to a predetermined index, and
specify, by using the added value, a first divided region from among divided regions, the first divided region being a divided region that includes pixels causing incorrect inference.

2. The analysis apparatus according to claim 1, wherein the specifying processing is configured to perform a process of:
segmenting the incorrect inference image into rectangular regions of the same size and the same shape; and
calculating an added value of a pixel value for each region according to the predetermined index by adding up the pixel values of the third map for each of the segmented rectangular regions.

3. The analysis apparatus according to claim 1, wherein the specifying processing is configured to perform a process of:
segmenting the incorrect inference image into regions of an element object contained in the incorrect inference image;
adding up pixel values of the third map for each of the segmented regions of the element object; and
calculating an added value of a pixel value for each region according to the predetermined index by dividing the added value for each segmented region of the element object by the area of each region of the element object.

4. The analysis apparatus according to claim 1, wherein the specifying processing is configured to perform a process of:
defining, as a first region, a region where the added value of the pixel value for each region according to the predetermined index satisfies a predetermined condition; and
defining, as a second region, a region where the added value of the pixel value for each region according to the predetermined index does not satisfy the predetermined condition.

5. The analysis apparatus according to claim 4, wherein the specifying processing is configured to perform a process of:
generating a synthesis image by synthesizing an image of the first region extracted from the refine image and an image of the second region extracted from the incorrect inference image; and
specifying an image section that causes the incorrect inference for each region, based on the score when the correct label is inferred with the generated synthesis image as an input.

6. The analysis apparatus according to claim 4, wherein the specifying processing is configured to perform a process of:
fragmenting the first region to generate fine adjustment blocks of the same size and the same shape;
changing some of the generated fine adjustment blocks from the first region to the second region;
generating a synthesis image by synthesizing an image of the first region excluding some of the fine adjustment blocks extracted from the refine image and an image of the second region including some of the fine adjustment blocks extracted from the incorrect inference image; and
specifying an image section that causes the incorrect inference for each region and for each fine adjustment block, based on the score when the correct label is inferred with the generated synthesis image as an input.

7. The analysis apparatus according to claim 6, wherein the specifying processing is configured to perform a process of:
determining some of the fine adjustment blocks to be changed from the first region to the second region, based on the added value obtained by adding the pixel value of the third map for each fine adjustment block.

8. A non-transitory computer-readable storage medium for storing an analysis program which causes a processor to perform processing, the processing comprising:
executing an image generating processing configured to generate a refine image having a maximized correct label score of inference from an incorrect inference image from which an incorrect label is inferred by a neural network;
executing a map generating processing configured to generate a third map by superimposing a first map and a second map, the first map indicating pixels to each of which a change is made in generating the refine image, of a plurality of pixels in the incorrect inference image, the second map indicating a degree of attention for each local region in the refine image, the each local region being a region that has drawn attention at the time of inference by the neural network, and the third map indicating a degree of importance for each of the pixels for inferring a correct label; and
executing a specifying processing configured to
obtain an added value for respective divided region in the third map by summing pixel values within the respective divided region, the respective divided region being a region divided according to a predetermined index, and
specify, by using the added value, a first divided region from among divided regions, the first divided region being a divided region that includes pixels causing incorrect inference.

9. An analysis method implemented by a computer, the analysis method comprising:
executing an image generating processing configured to generate a refine image having a maximized correct label score of inference from an incorrect inference image from which an incorrect label is inferred by a neural network;
executing a map generating processing configured to generate a third map by superimposing a first map and a second map, the first map indicating pixels to each of which a change is made in generating the refine image, of a plurality of pixels in the incorrect inference image, the second map indicating a degree of attention for each local region in the refine image, the each local region being a region that has drawn attention at the time of inference by the neural network, and the third map indicating a degree of importance for each of the pixels for inferring a correct label; and
executing a specifying processing configured to
obtain an added value for respective divided region in the third map by summing pixel values within the respective divided region, the respective divided region being a region divided according to a predetermined index, and
specify, by using the added value, a first divided region from among divided regions, the first divided region being a divided region that includes pixels causing incorrect inference.

* * * * *